(12) United States Patent
Yajima et al.

(10) Patent No.: US 7,683,749 B2
(45) Date of Patent: Mar. 23, 2010

(54) LINEAR ELECTROMAGNETIC ACTUATOR

(75) Inventors: Hisashi Yajima, Tsukuba-gun (JP); Nobuhiro Fujiwara, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 997 days.

(21) Appl. No.: 11/285,266

(22) Filed: Nov. 23, 2005

(65) Prior Publication Data

US 2006/0114090 A1 Jun. 1, 2006

(30) Foreign Application Priority Data

Nov. 30, 2004 (JP) ............................. 2004-347782

(51) Int. Cl.
*H01F 7/08* (2006.01)
(52) U.S. Cl. .......................... 335/222; 335/229; 310/12
(58) Field of Classification Search ................. 335/222, 335/229–234; 310/12
See application file for complete search history.

(56) References Cited

U.S. PATENT DOCUMENTS 4,127,835 A * 11/1978 Knutson ...................... 335/266
5,896,076 A * 4/1999 van Namen .................. 335/229
6,819,208 B1 11/2004 Peghaire et al.
2004/0135658 A1 7/2004 Ermert et al.

FOREIGN PATENT DOCUMENTS

| DE | 10238840 | 3/2004 |
|---|---|---|
| JP | 56-101371 | 8/1981 |
| JP | 58-51689 | 4/1983 |
| JP | 5-227729 | 9/1993 |
| JP | 10-290560 | 10/1998 |
| JP | 2001-25229 | 1/2001 |
| JP | 2002-233127 | 8/2002 |
| JP | 2004-221322 | 8/2004 |
| JP | 2004-274950 | 9/2004 |
| JP | 2004-312983 | 11/2004 |
| TW | 526629 | 4/2003 |

* cited by examiner

*Primary Examiner*—Ramon M Barrera
(74) *Attorney, Agent, or Firm*—Paul A. Guss

(57) ABSTRACT

First and second projections are formed to protrude toward a guide rail from both sides of a slide table. Third and fourth projections are formed to protrude toward the slide table from both sides of the guide rail. A plurality of balls are arranged in clearances between the first and second projections and the third and fourth projections.

22 Claims, 21 Drawing Sheets

US 7,683,749 B2

LINEAR ELECTROMAGNETIC ACTUATOR

BACKGROUND OF THE INVENTION

1. Field of the Invention

The present invention relates to a linear electromagnetic actuator comprising a permanent magnet and a coil which face each other to displace the permanent magnet by the thrust force generated by the current allowed to flow through the coil.

2. Description of the Related Art

In a linear electromagnetic actuator of the movable magnet type, a permanent magnet and a coil which face each other displace the permanent magnet by the thrust force which is generated based on the Fleming's left hand rule when the current is allowed to flow through the coil (see Japanese Laid-Open Patent Publication Nos. 5-227729 and 10-290560).

In the linear electromagnetic actuator disclosed in Japanese Laid-Open Patent Publication Nos. 5-227729 and 10-290560, the permanent magnet is fixed to a first yoke, and the first yoke is supported by a slider. Meanwhile, the coil is fixed to a second yoke, and the second yoke is supported by a guide rail. Further, a guide member is interposed between the slider and the guide rail.

A magnetic path passing through the permanent magnet, the first yoke, the clearance between the first yoke and the second yoke, the second yoke, the coil, the gap between the coil and the permanent magnet, and the permanent magnet, is formed by the permanent magnet in the linear electromagnetic actuator. When the current is allowed to flow through the coil, a magnetic path of the coil, the gap between the coil and the permanent magnet, the permanent magnet, the first yoke, the clearance between the first yoke and the second yoke, the second yoke, and the coil, is also formed. Accordingly, the thrust force, which acts on the permanent magnet, is generated depending on the direction of the current and the directions of the respective magnetic fluxes passing through the respective magnetic paths. The permanent magnet, the first yoke, and the slider are displaced and guided by the guide member.

When attempting to reduce the thickness of the linear electromagnetic actuator, which is disclosed in Japanese Laid-Open Patent Publication Nos. 5-227729 and 10-290560, the cross-sectional area of the magnetic path is decreased at the first yoke and the second yoke, and local magnetic saturation occurs in the first yoke and the second yoke. As a result, leakage magnetic flux is generated from the first yoke and the second yoke, and the thrust force, which acts on the permanent magnet, is lowered. Further, due to the leakage magnetic flux, some kind of malfunction may occur in the electronic apparatus and the electronic circuit disposed around the linear electromagnetic actuator. Also, attraction of a magnetic member disposed around the linear electromagnetic actuator to the linear electromagnetic actuator may occur as well as malfunction of the electronic circuit and the encoder arranged in the linear electromagnetic actuator.

Further, dust, which is composed of the magnetic member, may be adhered to the guide member by the magnetic flux passing through the magnetic path, thereby increasing the sliding resistance of the guide member with respect to the slider. As a result, it is difficult to smoothly displace the slider, and dust escaping out from the linear electromagnetic actuator may pollute the surrounding environment.

SUMMARY OF THE INVENTION

An object of the present invention is to provide a linear electromagnetic actuator which suppresses the occurrence of magnetic saturation in a yoke.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
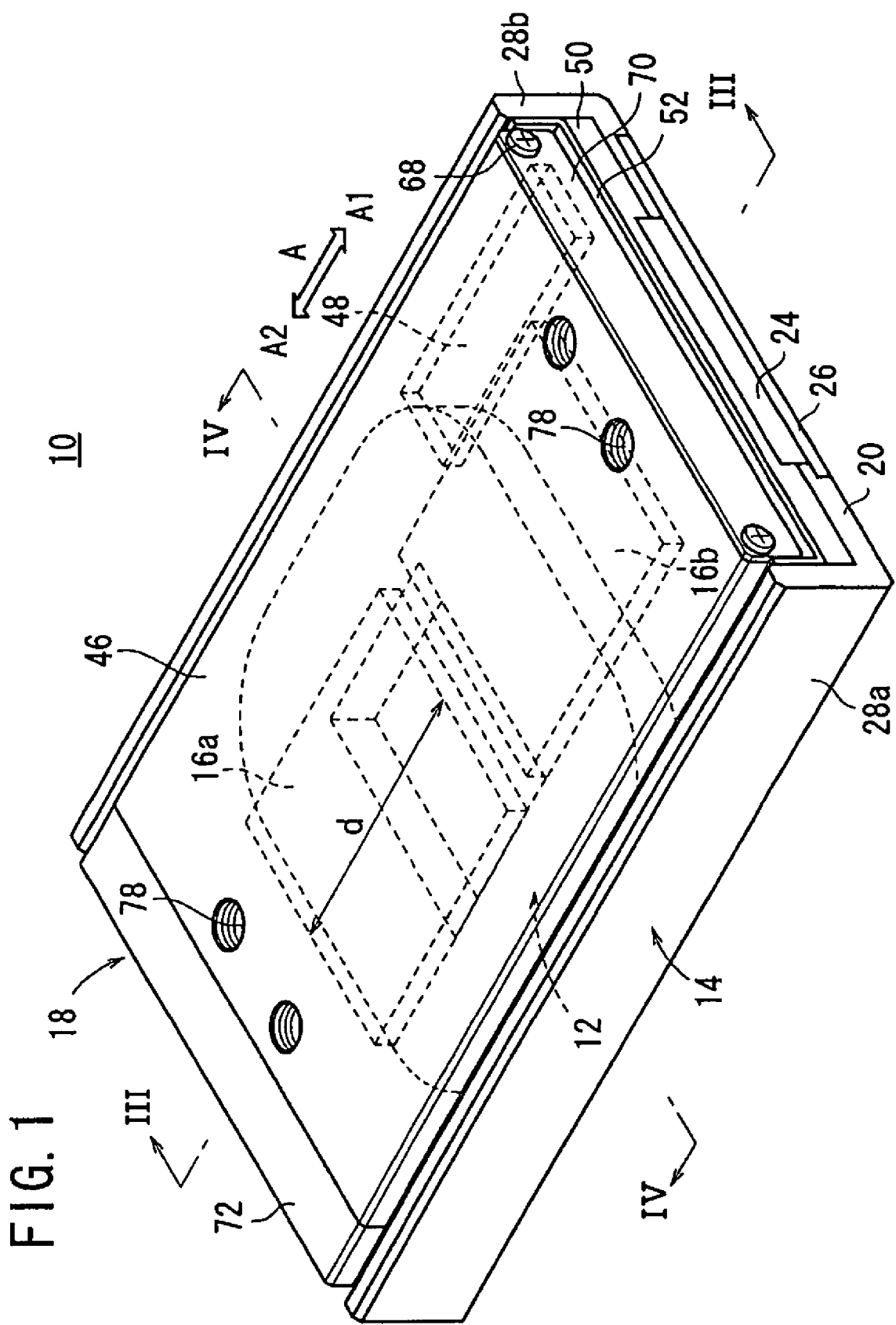
FIG. 1 is a perspective view illustrating a linear electromagnetic actuator according to an embodiment of the present invention.

As shown in FIGS. 1 to 4, a linear electromagnetic actuator 10 has a fixed section 14 in which a coil 12 is arranged, and a movable section 18 in which two permanent magnets 16a, 16b are arranged facing the coil 12.

The fixed section 14 includes a guide rail (second yoke) 20 which has a substantially U-shaped cross section, a coil 12 which is arranged at a substantially central portion of the upper surface of the guide rail 20, and a circuit board 26 made of resin on which an encoder 22 and an electronic circuit 24 are mounted.

Figure 2:
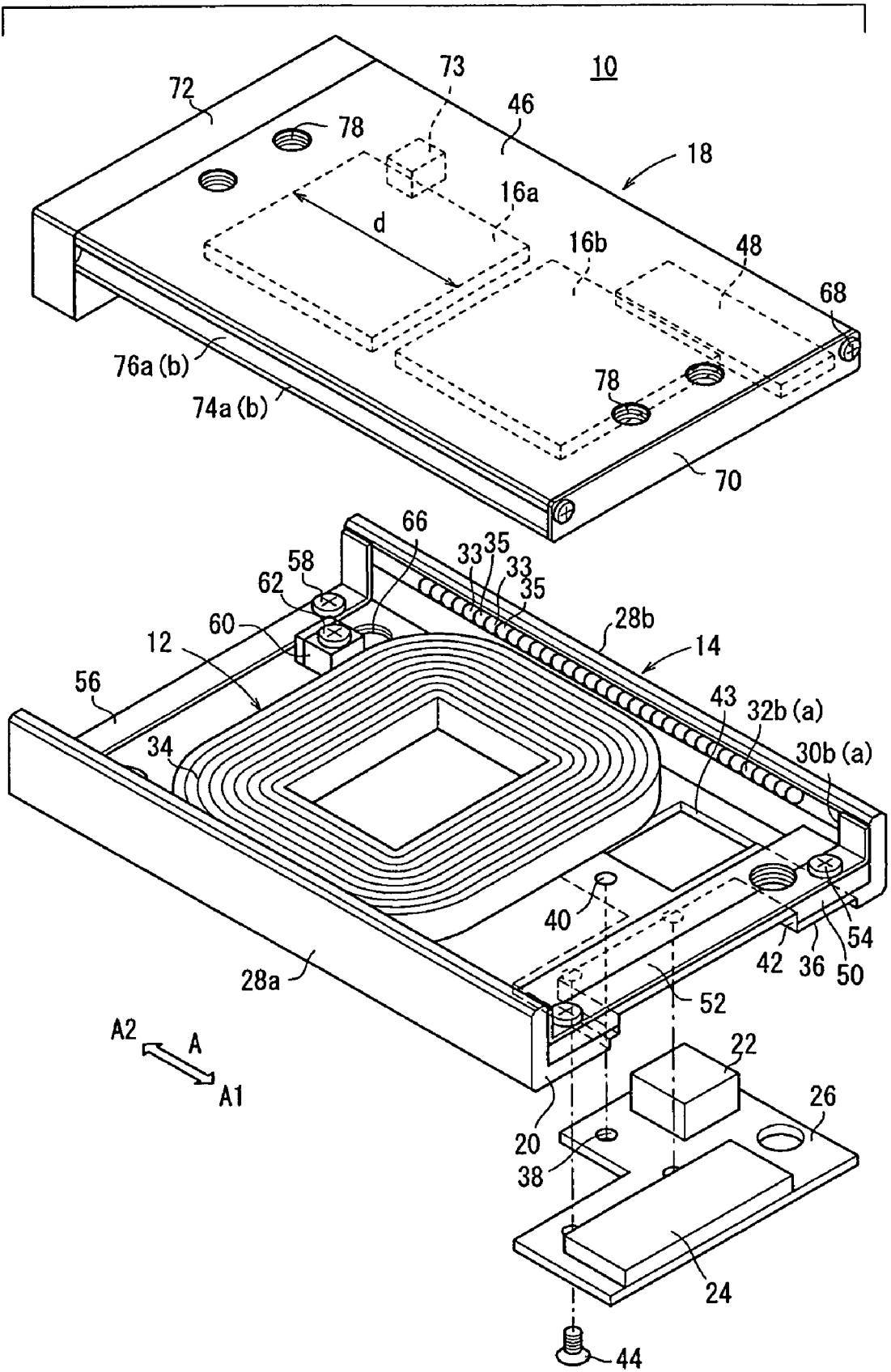
FIG. 2 is an exploded perspective view illustrating the linear electromagnetic actuator shown in FIG. 1.
Figure 3:
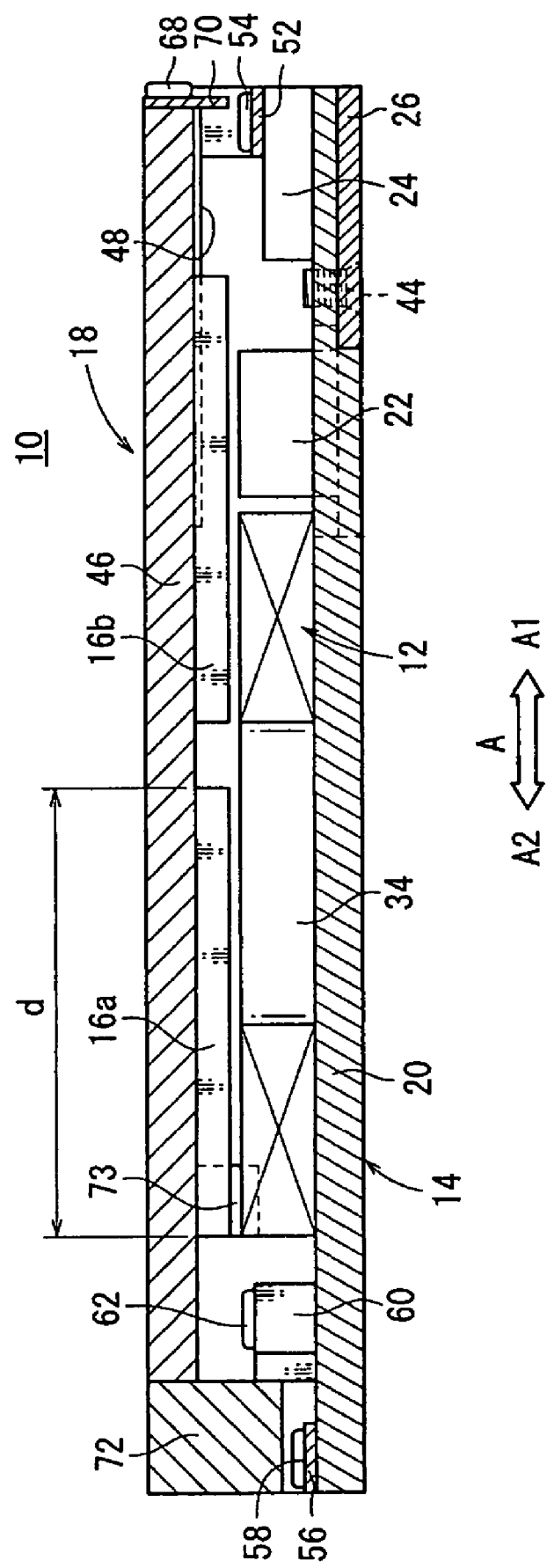
FIG. 3 is a sectional view taken along a line III-III shown in FIG. 1.

Projections (third and fourth projections) 28a, 28b, which protrude from the base of the guide rail 20 toward the movable section 18, are formed on the both sides of the guide rail 20. Guide grooves 30a, 30b, which extend in the direction of the arrow A as shown in FIGS. 1 to 3, are formed at inner portions of the projections 28a, 28b, respectively. A plurality of balls (first and second guide members) 32a, 32b, which serve as rolling members, are arranged in the guide grooves 30a, 30b. In this arrangement, the guide rail 20 has a width which is wider than that of a slide table (first yoke) 46 of the movable section 18. Each of the projections 28a, 28b of the guide rail 20 is formed outside of projections (first and second projections) 74a, 74b of the slide table 46 (see FIG. 4). It is preferable that the wall thickness of each of the guide rail 20 and the projections 28a, 28b is thinner than the width d (see FIG. 3) of each of permanent magnets 16a, 16b in the direction of the arrow A.

The coil 12 is a hollow core coil formed by mold forming with an insulating member 34 composed of resin by winding a conductive element wire coated with an insulating film.

A recess 36, which is indented upwardly, is formed at the bottom of one end of the guide rail 20 (the side of the direction of the arrow A1). The circuit board 26 is fitted into the recess 36. The circuit board 26 is fixed to the guide rail 20 by a screw 44 screwed into a hole 38 formed through the circuit board 26 and a hole 40 formed through the guide rail 20. The recess 36 has a cutout 42. The electronic circuit 24 is fitted into the cutout 42. A hole 43 is formed in the recess 36 near the coil 12. The encoder 22 is inserted into the hole 43.

The electronic circuit 24 is electrically connected to the element wire of the coil 12 and the encoder 22 respectively. The current is supplied to the electric wire based on the control signal from an unillustrated external apparatus. Further, the electric signal, which is inputted into the encoder 22, is outputted to the external apparatus.

The encoder 22 faces a scale 48 which is arranged on the bottom surface of the slide table 46 of the movable section 18. When the movable section 18 is displaced in the direction of the arrow A, then the reflected light of the light emitted to the scale 48 is received, and the displacement amount of the movable section 18 is calculated based on the amount of the reflected light. The calculated result is outputted as the electric signal to the electronic circuit 24.

A bridge member 50 over the electronic circuit 24 is arranged on one end of the guide rail 20. A ball-fastening member 52 having a substantially U-shaped cross section, which prevents the balls 32a, 32b from falling out, is fixed to the bridge member 50 by screws 54.

A ball-fastening member 56 having a substantially U-shaped cross section, which prevents the balls 32a, 32b from falling out together with the ball-fastening member 52, is fixed on the other end of the guide rail 20 by screws 58.

A stopper 60, which prohibits further displacement of the movable section 18 when the movable section 18 is displaced in the direction of the arrow A1, is fixed by a screw 62 on the upper surface of the guide rail 20 between the ball-fastening member 56 and the coil 12. In this arrangement, the stopper 60 makes abutment against the side surface of an end block 72 which is connected to the other end of the slide table 46 by unillustrated screws. Accordingly, the movable section 18 is prevented from displacement in the direction of the arrow A1 of the guide rail 20. FIGS. 1 and 3 show a state in which the stopper 60 abuts against the end block 72 to stop the movement of the movable section 18 in the direction of the arrow A1.

As shown in FIG. 2, a plurality of screw holes 66, which have a diameter larger than that of the hole 40, are formed on the one end and the other end of the guide rail 20. The guide rail 20 can be fixed to another member by screwing unillustrated screws into the respective screw holes 66.

Meanwhile, as shown in FIGS. 1 to 4, the movable section 18 includes the slide table 46 which has a substantially U-shaped cross section, a rectangular plate-shaped member 70 which is fixed by screws 68 to one end of the slide table 46 in the direction of the arrow A1, the end block 72 which is fixed by unillustrated screws to the other end of the slide table 46 in the direction of the arrow A2, the two permanent magnets 16a, 16b which face the coil 12 and which are disposed at substantially central portions of the bottom surface of the slide table 46, the scale 48 face the encoder 22 and which is disposed on the bottom surface of the slide table 46, and a stopper 73 which is arranged on the bottom surface of the slide table 46 in the vicinity of the permanent magnet 16a.

The width of the slide table 46 is designed to be smaller than the width of the guide rail 20. The projections (first and second projections) 74a, 74b, which protrude from the base of the slide table 46 toward the fixed section 14, are formed on the both sides of the slide table 46. Guide grooves 76a, 76b, in which the balls 32a, 32b are arranged, are formed along the direction of the arrow A outside of the projections 74a, 74b respectively. In this arrangement, the slide table 46 and the guide rail 20 are connected to each other by the balls 32a, 32b (see FIG. 4).

That is, in the linear electromagnetic actuator 10, the guide rail 20 and the slide table 46 are arranged so that the height of the guide grooves 76a, 76b is substantially the same as the height of the guide grooves 30a, 30b. The plurality of balls 32a, 32b, which serve as the linear guide having a finite length, are accommodated in the clearances formed by the guide grooves 76a, 76b and the guide grooves 30a, 30b. Therefore, the movable section 18 is displaceable in the direction of the arrow A with respect to the fixed section 14 under the guiding action based on the rotation of the respective balls 32a, 32b.

The permanent magnets 16a, 16b, which are substantially rectangular, are magnetized in mutually different directions (for example, in different vertical directions), and are fixed to the bottom surface of the slide table 46 while being separated from each other by a predetermined distance. In this arrangement, the width of each of the permanent magnets 16a, 16b is designed to be narrower than the width of the coil 12.

The width of the plate-shaped member 70 is set so that when the movable section 18 is displaced in the direction of the arrow A2, the plate-shaped member 70 makes abutment against the balls 32a, 32b disposed in the direction of the arrow A1.

A plurality of screw holes 78 are formed on one end and the other end of the slide table 46. Another member can be fixed to the slide table 46 screwing screws into the respective screw holes 78. Meanwhile, unillustrated screw holes are formed on the side surface of the end block 72 in the direction of the arrow A2. Another member can be fixed thereto by screwing screws into the screw holes.

The stopper 73 makes abutment against the side surface of the stopper 60 in the direction of the arrow A1. Accordingly, the guide rail 20 is prevented from displacing in the direction of the arrow A2.

In the linear electromagnetic actuator 10 as described above, the guide rail 20 and the slide table 46 are composed of magnetic members. The bridge member 50, the ball-fastening members 52, 56, the stopper 60, the plate-shaped member 70, the end block 72, and the screws 44, 54, 58, 62, 68 are composed of nonmagnetic members. The spherical members, which are used as the balls 32a, 32b, include steel balls (first rolling members) 33 composed of magnetic members, and spherical members (second rolling members) 35 composed of nonmagnetic members. As shown in FIG. 2, the steel balls 33 and the spherical members 35 composed of the nonmagnetic members are alternately arranged along the direction of the arrow A.

The linear electromagnetic actuator 10 according to the embodiment of the present invention is basically constructed as described above. Next, its operation will be explained with reference to FIGS. 1 to 6.

Figure 5:
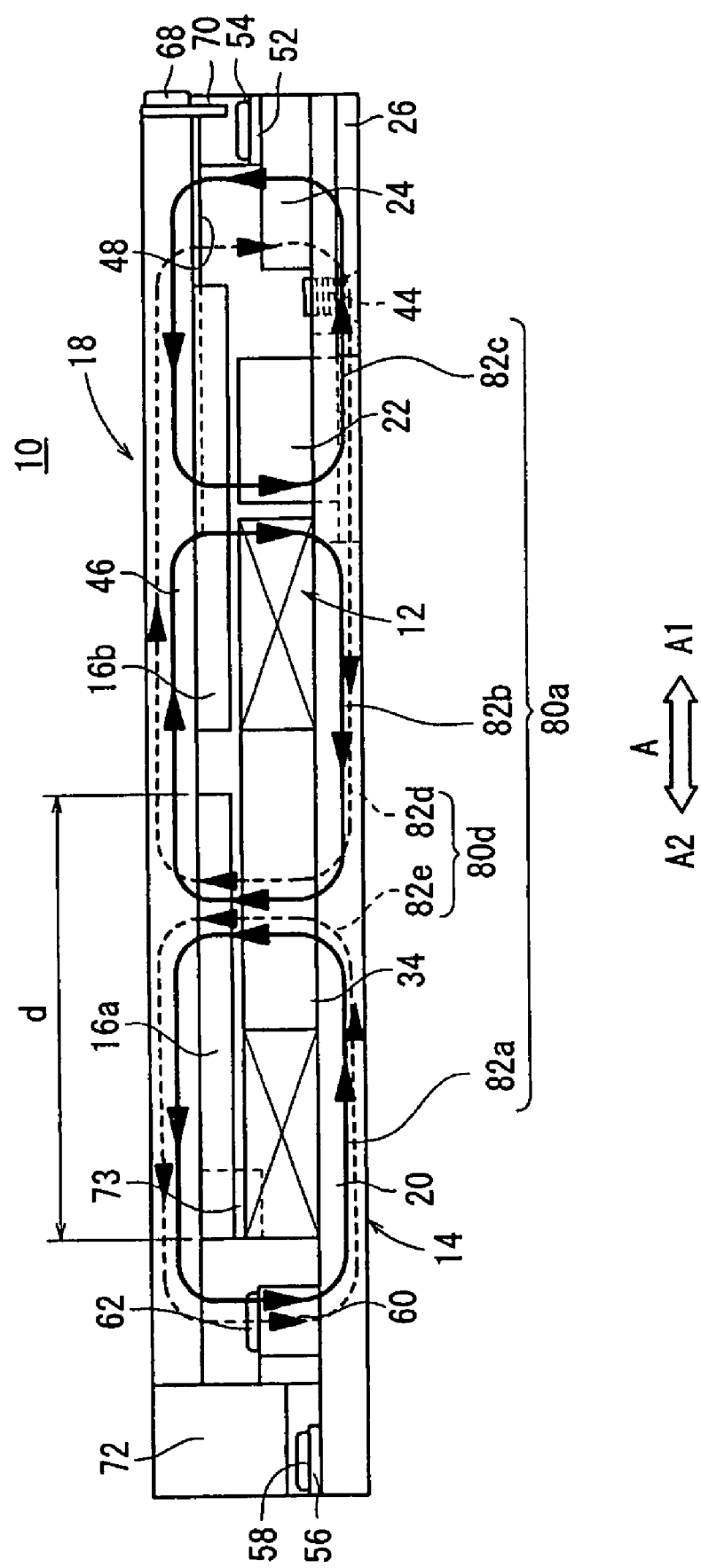
FIG. 5 is a sectional view in which first and fourth magnetic paths are superimposed on the linear electromagnetic actuator shown in FIG. 3.

Firstly, an explanation will be made about a case (Case 1) in which the movable section 18 is displaced in the direction of the arrow A2 in a state in which the movable section 18 is positioned as shown in FIGS. 1, 2, and 5 with respect to the fixed section 14.

Figure 6:
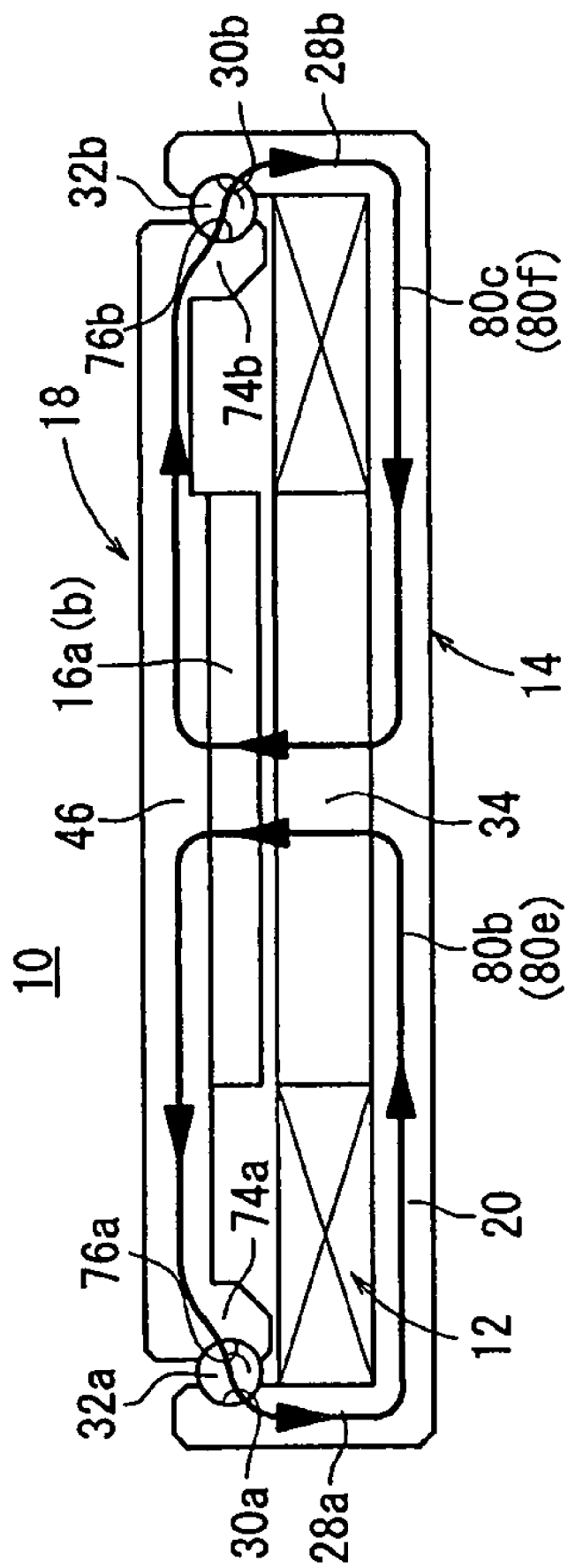
FIG. 6 is a sectional view in which second, third, fifth, and sixth magnetic paths are superimposed on the linear electromagnetic actuator shown in FIG. 4.

In Case 1, when no current is supplied to the coil 12, the following magnetic paths (first to third magnetic paths) 80a to 80c, through which the respective magnetic fluxes pass, are formed in the linear electromagnetic actuator 10 by the magnetic fluxes generated by the permanent magnets 16a, 16b (see FIGS. 5 and 6).

The first magnetic path 80a includes the following: a first route 82a passing through the permanent magnet 16a, the slide table 46, the clearance between the other end of the slide table 46 and the other end of the guide rail 20, the base of the guide rail 20, the coil 12, the gap between the coil 12 and the permanent magnet 16a, and the permanent magnet 16a; a second route 82b passing through the permanent magnet 16a, the slide table 46, the permanent magnet 16b, the gap between the permanent magnet 16b and the coil 12, the coil 12, the base of the slide table 46, the coil 12, the gap between the permanent magnet 16a and the coil 12, and the permanent magnet 16a; and a third route 82c passing through the permanent magnet 16b, the slide table 46, the clearance between one end of the slide table 46 and one end of the guide rail 20, the base of the guide rail 20, the coil 12, the gap between the coil 12 and the permanent magnet 16b, and the permanent magnet 16b.

The second magnetic path 80b passes through the permanent magnets 16a, 16b, the slide table 46, the first projection 74a of the slide table 46, the balls 32a (steel balls 33), the third projection 28a of the guide rail 20, the base of the guide rail 20, the coil 12, the gap between the coil 12 and the permanent magnets 16a, 16b, and the permanent magnets 16a, 16b.

The third magnetic path 80c passes through the permanent magnets 16a, 16b, the slide table 46, the second projection 74b of the slide table 46, the balls 32b (steel balls 33), the fourth projection 28b of the guide rail 20, the base of the guide rail 20, the coil 12, the gap between the coil 12 and the permanent magnets 16a, 16b, and the permanent magnets 16a, 16b.

Meanwhile, when the current is applied to the element wire of the coil 12 from the electronic circuit 24 (see FIGS. 1 to 3 and 5), then the coil 12 generates the magnetic flux by the current, and the following magnetic paths (fourth to sixth magnetic paths) 80d to 80f are formed by the magnetic flux in the linear electromagnetic actuator 10 in addition to the first to third magnetic paths 80a to 80c described above.

The fourth magnetic path 80d includes the following: a fourth route 82d passing through the coil 12, the gap between the coil 12 and the permanent magnets 16a, 16b, the permanent magnets 16a, 16b, the slide table 46, the clearance between one end of the slide table 46 and one end of the guide rail 20, the base of the guide rail 20, and the coil 12; and a fifth route 82e passing through the coil 12, the gap between the coil 12 and the permanent magnets 16a, 16b, the permanent magnets 16a, 16b, the clearance between the other end of the slide table 46 and the guide rail 20, the base of the guide rail 20, and the coil 12.

The fifth magnetic path 80e passing through the coil 12, the gap between the coil 12 and the permanent magnets 16a, 16b, the permanent magnets 16a, 16b, the slide table 46, the first projection 74a of the slide table 46, the balls 32a (steel balls 33), the third projection 28a of the guide rail 20, the base of the guide rail, and the permanent magnets 16a, 16b.

The sixth magnetic path 80f passing through the coil 12, the gap between the coil 12 and the permanent magnets 16a, 16b, the permanent magnets 16a, 16b, the slide table 46, the second projection 74b of the slide table 46, the balls 32b (steel balls 33), the fourth projection 28b of the guide rail 20, the base of the guide rail, and the coil 12.

The thrust force (Lorentz force), which is directed in the direction of the arrow A1 based on the Fleming's left hand rule, is generated in the coil 12 depending on the directions of the respective magnetic fluxes passing through the first to sixth magnetic paths 80a to 80f and the direction of the current supplied to the element wire of the coil 12. When the guide rail 20 of the fixed section 14 is fixed by another member, the thrust force, which is directed in the direction of the arrow A2 based on the thrust force, acts on the movable section 18. The movable section 18 is displaced in the direction of the arrow A2 under the guiding action based on the rotation of the balls 32a, 32b. The movable section 18 stops at the position at which the stopper 60 abuts against the stopper 73.

The arrows of the first to sixth magnetic paths 80a to 80f in FIGS. 5 and 6 indicate the directions of the passage of the magnetic flux generated when the current is allowed to flow through the coil 12 and the magnetic fluxes generated by the permanent magnets 16a, 16b.

Next, an explanation will be made about a case (Case 2) in which the movable section 18, which protrudes from the fixed section 14 in the direction of the arrow A2, is displaced to the position shown in FIGS. 1, 3, and 5.

In Case 2, the current, which flows in the opposite direction (opposite phase) with respect to the current of Case 1, is supplied from the electronic circuit 24 to the element wire of the coil 12.

In this case, the direction of the magnetic flux generated by the coil 12 is opposite to the direction of the magnetic flux generated by the coil 12 in Case 1.

Therefore, the thrust force, which is directed in the direction of the arrow A1 based on the Fleming's left hand rule, is generated in the permanent magnets 16a, 16b depending on the directions of the respective magnetic fluxes passing through the first to sixth magnetic paths 80a to 80f and the direction of the current allowed to flow through the element wire of the coil 12. Accordingly, the movable section 18 is displaced in the direction of the arrow A1 under the guiding action based on the rotation of the balls 32a, 32b. The movable section 18 stops at the position shown in FIGS. 1, 3, and 5 at which the side surface of the end block 72 abuts against the side surface of the stopper 60.

Next, an explanation will be made with reference to FIGS. 7 to 10 about results of the simulation of the magnetic flux density distribution in the linear electromagnetic actuator 10.

Figure 7:
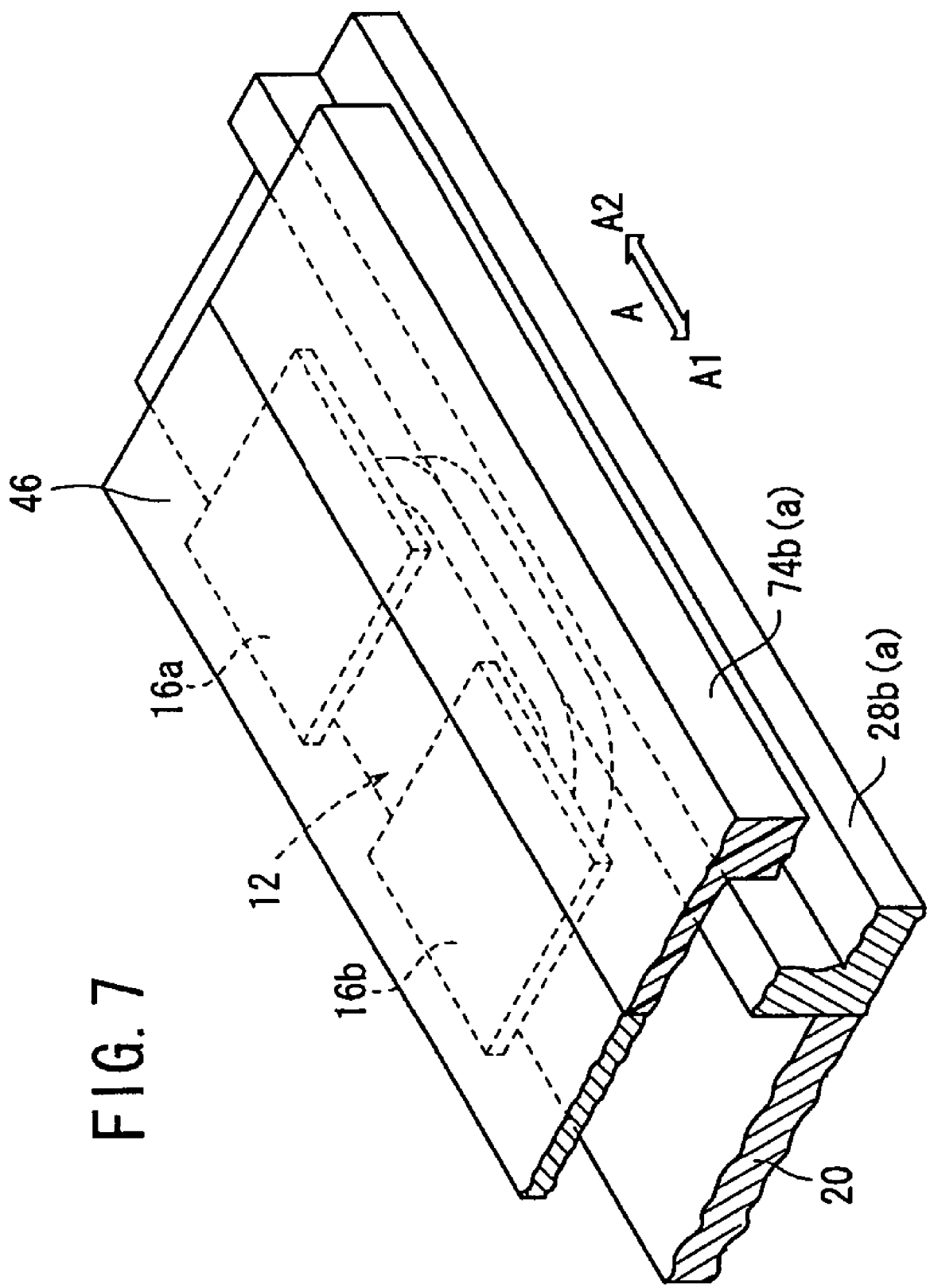
FIG. 7 is a perspective view illustrating major parts of a simulation model used in a Comparative Example.
Figure 8:
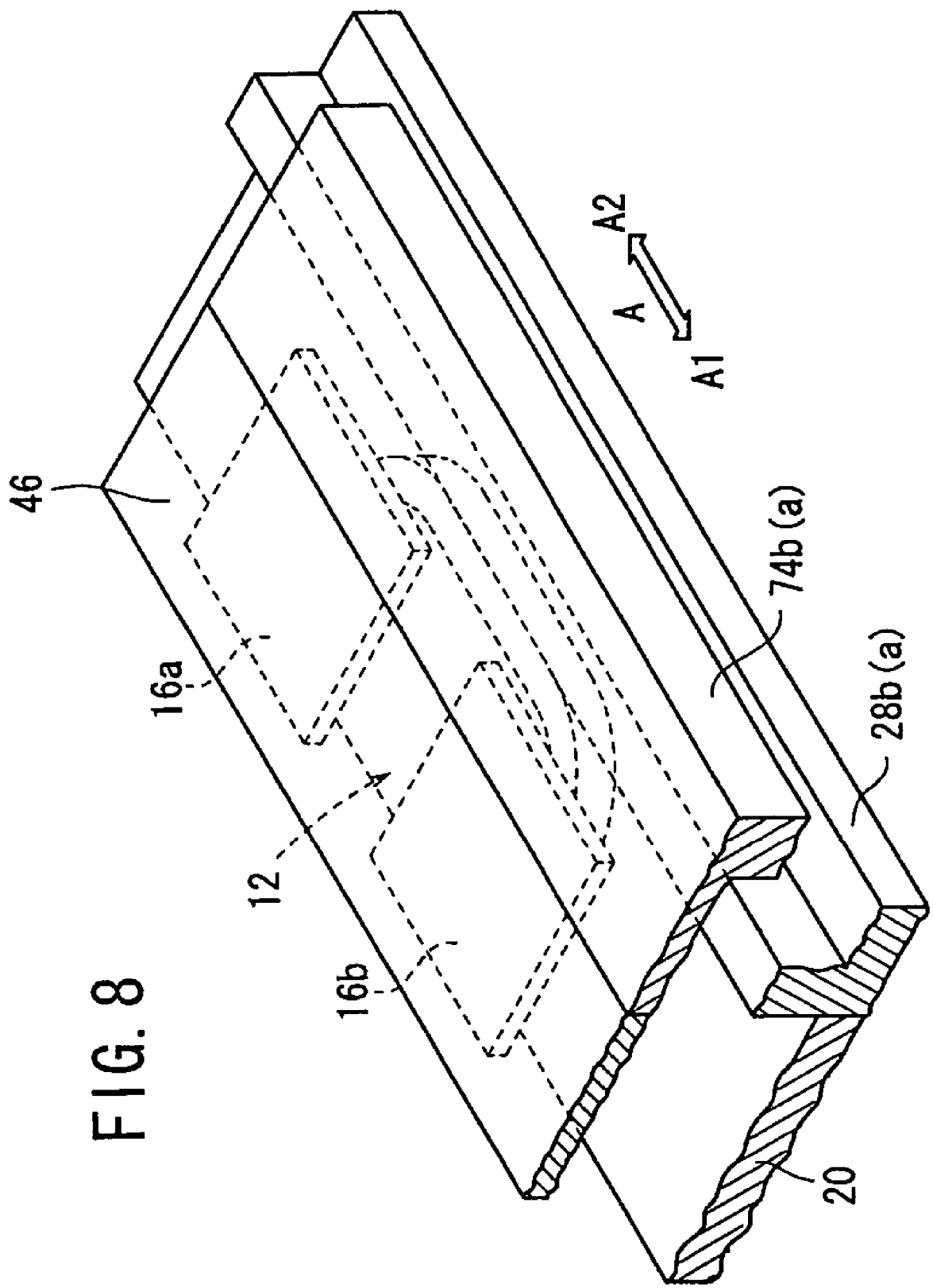
FIG. 8 is a perspective view illustrating major parts of a simulation model used in a Working Example.

In this simulation, comparison is made of the magnetic flux density distribution obtained when the current is allowed to flow through the element wire of the coil 12 to generate the magnetic flux in relation to a case in which the first and second projections 74a, 74b of the slide table 46 and the third and fourth projections 28a, 28b of the guide rail 20 are composed of nonmagnetic members (resin) as shown in FIG. 7 (hereinafter referred to as "Comparative Example") and a case in which the first and second projections 74a, 74b of the slide table 46 and the third and fourth projections 28a, 28b of the guide rail 20 are composed of magnetic members as shown in FIG. 8 (hereinafter referred to as "Working Example"). The Comparative Example is an example of the linear electromagnetic actuator concerning the conventional technique, and the Working Example in an example of the linear electromagnetic actuator 10 according to the embodiment of the present invention.

In order to simplify the calculation of the magnetic flux density distribution in the simulation, the balls 32a, 32b and the guide grooves 30a, 30b, 76a, 76b are omitted, and the first to fourth projections 28a, 28b, 74a, 74b are designed to have an L-shaped cross section.

Figure 9:
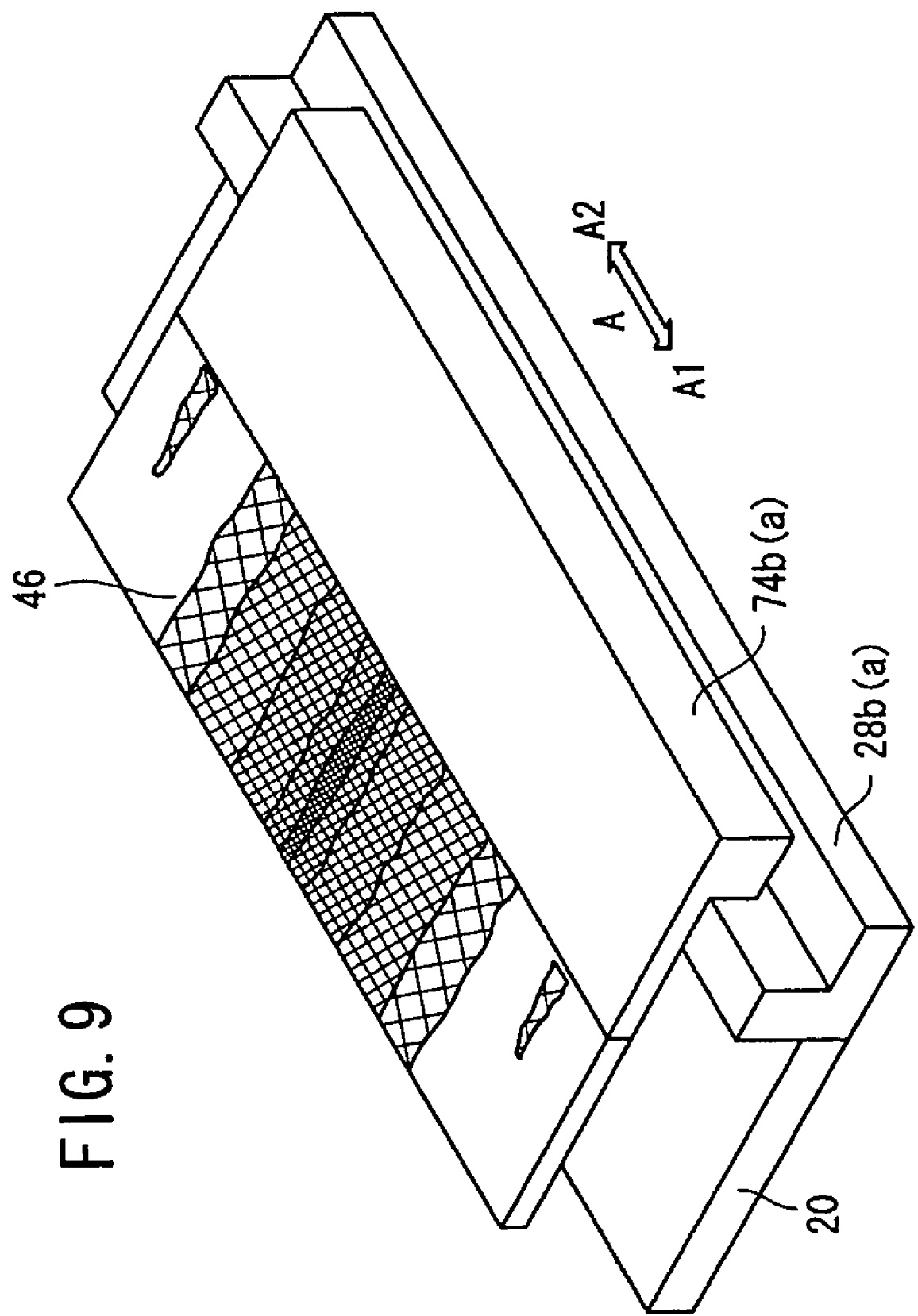
FIG. 9 is a perspective view illustrating major parts of a magnetic flux distribution in the simulation model shown in FIG. 7.
Figure 10:
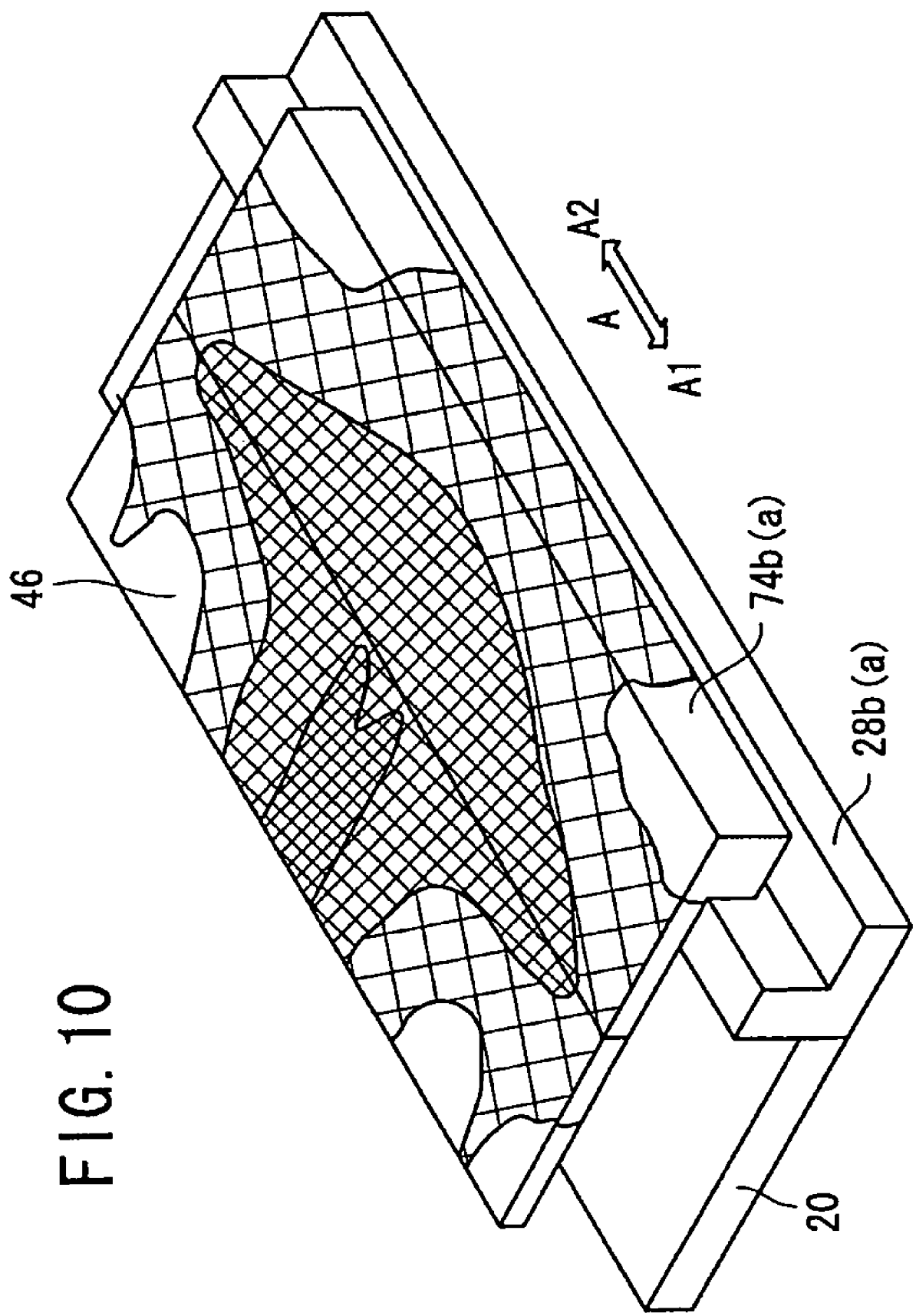
FIG. 10 is a perspective view illustrating major parts of a magnetic flux distribution in the simulation model shown in FIG. 8.

FIG. 9 shows the magnetic flux density distribution in relation to the slide table 46 of the Comparative Example, and FIG. 10 shows the magnetic flux density distribution in relation to the slide table 46 of the Working Example. In the magnetic flux density distributions shown in FIGS. 9 and 10, the larger the density of the hatching is, the larger the magnetic flux density is.

In of the magnetic flux density distribution of the Comparative Example shown in FIG. 9, the magnetic flux density is locally high at portions of the slide table 46 in the vicinity of the permanent magnets 16a, 16b, and magnetic saturation occurs at these portions. That is, in Comparative Example, only the first magnetic path 80a and the fourth magnetic path 80d (see FIG. 5) are provided in the linear electromagnetic actuator, because the first to fourth projections 28a, 28b, 74a, 74b are composed of the nonmagnetic members (resin) (see FIG. 7). As a result, magnetic flux concentration and magnetic saturation occur at the portions as described above due to the magnetic fluxes generated by the permanent magnets 16a, 16b and the magnetic flux generated by the coil 12.

On the contrary, in the magnetic flux density distribution of the Working Example shown in FIG. 10, the magnetic flux density is lowered at the portions of the slide table 46 in the vicinity of the permanent magnets 16a, 16b as compared with the magnetic flux density of the Comparative Example (see FIG. 9). Further, the magnetic flux density distribution covers a wide range including the base of the slide table 46 and the first and second projections 74a, 74b.

That is, in the Working Example, the first to fourth projections 28a, 28b, 74a, 74b are composed of the magnetic members (see FIG. 8). Therefore, the first to sixth magnetic paths 80a to 80f are formed in the linear electromagnetic actuator 10 (see FIGS. 5 and 6). As a result, the magnetic fluxes generated by the permanent magnets 16a, 16b and the magnetic flux generated by the current allowed to flow through the coil 12 are divided by the first to sixth magnetic paths 80a to 80f to pass through the slide table 46. Accordingly, it is possible to suppress local magnetic flux concentration and the occurrence of magnetic saturation in the slide table 46.

As described above, in the case of the linear electromagnetic actuator 10 according to the embodiment of the present invention, the first and second projections 74a, 74b are formed to protrude from the slide table 46 as the first yoke toward the guide rail 20 as the second yoke. The first and second projections 74a, 74b are slightly separated from the guide rail 20.

When no current is allowed to flow through the coil 12, the first magnetic path 80a is formed by the magnetic fluxes generated by the permanent magnets 16a, 16b in the linear electromagnetic actuator 10. The first magnetic path 80a includes the following: the first route 82a passing through the permanent magnet 16a, the slide table 46, the clearance between the other end of the slide table 46 and the other end of the guide rail 20, the base of the guide rail 20, the coil 12, the gap between the coil 12 and the permanent magnet 16a, and the permanent magnet 16a; the second route 82b passing through the permanent magnet 16a, the slide table 46, the permanent magnet 16b, the gap between the permanent magnet 16b and the coil 12, the coil 12, the base of the slide table 46, the coil 12, the gap between the permanent magnet 16a and the coil 12, and the permanent magnet 16a; and the third route 82c passing through the permanent magnet 16b, the slide table 46, the clearance between one end of the slide table 46 and one end of the guide rail 20, the base of the guide rail 20, the coil 12, the gap between the coil 12 and the permanent magnet 16b, and the permanent magnet 16b.

The second magnetic path 80b is also formed in the linear electromagnetic actuator 10 in addition to the first magnetic path 80a, passing through the permanent magnets 16a, 16b, the slide table 46, the first projection 74a of the slide table 46, the balls 32a (steel balls 33), the third projection 28a of the guide rail 20, the base of the guide rail, the coil 12, the gap between the coil 12 and the permanent magnets 16a, 16b, and the permanent magnets 16a, 16b.

Further, the third magnetic path 80c is also formed, which passes through the permanent magnets 16a, 16b, the slide table 46, the second projection 74b of the slide table 46, the balls 32b (steel balls 33), the fourth projection 28b of the guide rail 20, the base of the guide rail, the coil 12, the gap between the coil 12 and the permanent magnets 16a, 16b, and the permanent magnets 16a, 16b.

Meanwhile, when the current is allowed to flow through the coil 12, the fourth magnetic path 80d is formed in the linear electromagnetic actuator 10. The fourth magnetic path 80d includes the following: the fourth route 82d passing through the coil 12, the gap between the coil 12 and the permanent magnets 16a, 16b, the permanent magnets 16a, 16b, the slide table 46, the clearance between one end of the slide table 46 and one end of the guide rail 20, the base of the guide rail 20, and the coil 12; the fifth route 82e passing through the coil 12, the gap between the coil 12 and the permanent magnets 16a, 16b, the permanent magnets 16a, 16b, the slide table 46, the clearance between the other end of the slide table 46 and the other end of the guide rail 20, the base of the guide rail 20, and the coil 12.

Further, in addition to the fourth magnetic path 80*d*, the following are formed in the linear electromagnetic actuator 10: the fifth magnetic path 80*e* passing through the coil 12, the gap between the coil 12 and the permanent magnets 16*a*, 16*b*, the permanent magnets 16*a*, 16*b*, the slide table 46, the first projection 74*a* of the slide table 46, the balls 32*a* (steel balls 33), the third projection 28*a* of the guide rail 20, the base of the guide rail, and the permanent magnets 16*a*, 16*b*; and the sixth magnetic path 80*f* passing through the coil 12, the gap between the coil 12 and the permanent magnets 16*a*, 16*b*, the permanent magnets 16*a*, 16*b*, the slide table 46, the second projection 74*b* of the slide table 46, the balls 32*b* (steel balls 33), the fourth projection 28*b* of the guide rail 20, the base of the guide rail, and the coil 12.

In the linear electromagnetic actuator concerning the conventional technique, only the first and fourth magnetic paths 80*a*, 80*d* are formed. Therefore, the magnetic flux is undesirably concentrated on the guide rail and the slide table, and magnetic saturation occurs.

On the contrary, in the linear electromagnetic actuator 10 according to the embodiment of the present invention, the magnetic flux generated by the coil 12 and the magnetic fluxes generated by the permanent magnets 16*a*, 16*b* are divided by the first to sixth magnetic paths 80*a* to 80*f* to pass through the guide rail 20 and the slide table 46 as described above. Therefore, local magnetic flux concentration is avoided in the guide rail 20 and the slide table 46. As a result, magnetic saturation is suppressed. Therefore, occurrence of leakage magnetic flux can be prevented, thereby avoiding malfunctioning of the electronic circuit and the electronic apparatus arranged internally in or externally of the linear electromagnetic actuator 10 and also avoiding attraction of the magnetic member to the linear electromagnetic actuator 10. Further, the total amount of the magnetic flux passing through the guide rail 20 and the slide table 46 is increased, and the thrust force to displace the permanent magnets 16*a*, 16*b* is increased. Accordingly, the movable section 18, which includes the permanent magnets 16*a*, 16*b*, is displaceable under the guiding action of the balls 32*a*, 32*b*.

The first and second projections 74*a*, 74*b* are slightly separated from the guide rail 20. Therefore, it is possible to avoid occurrence of leakage magnetic flux at the clearances between the guide rail 20 and the first and second projections 74*a*, 74*b*.

The third projection 28*a* is formed to protrude along the first projection 74*a*, while the fourth projection 28*b* is formed to protrude along the second projection 74*b*.

Therefore, the areas, in which the slide table 46 and the guide rail 20 face each other at the first to fourth projections 28*a*, 28*b*, 74*a*, 74*b*, are increased. It is possible to suppress magnetic flux concentration and magnetic saturation at the second, third, fifth, and sixth magnetic paths 80*b*, 80*c*, 80*e*, 80*f*.

The steel balls 33 composed of the magnetic members are used for a part of the balls 32*a*, 32*b*. Therefore, the magnetic flux, which passes through the second and third magnetic paths 80*b*, 80*c*, passes through the steel balls 33.

It is possible to further suppress occurrence of leakage magnetic flux at the clearances between the first and second projections 74*a*, 74*b* and the third and fourth projections 28*a*, 28*b*.

In the linear electromagnetic actuator 10 according to the embodiment of the present invention, when the movable section 18 is displaced in the direction of the arrow A under the guiding action of the plurality of balls 32*a*, 32*b*, each of the balls 32*a*, 32*b* are rotated in the same direction. However, when comparison is made between the mutually opposing surfaces of adjacent balls 32*a*, 32*b*, the balls 32*a*, 32*b* are rotated in mutually opposite directions.

In this arrangement, the permanent magnets 16*a*, 16*b*, which are arranged along the direction of the arrow A, are magnetized in mutually opposite directions. Therefore, if all of the balls 32*a*, 32*b* are the steel balls 33, then the magnetic force, which is based on the magnetic flux generated by the permanent magnet 16*b*, acts in the direction of the arrow A on the steel balls 33 which are arranged on the side in the direction of the arrow A1 with respect to the center of the linear electromagnetic actuator 10. Meanwhile, the magnetic force, which is based on the magnetic flux generated by the permanent magnet 16*a*, acts in the direction of the arrow A on the steel balls 33 which are arranged on the side in the direction of the arrow A2 with respect to the center of the linear electromagnetic actuator 10. Therefore, the adjacent steel balls 33 contact each other due to magnetic force, and frictional resistance occurs because of the rotation of the adjacent steel balls 33 in the opposite directions. Ultimately, rotation of the steel balls 33 are stopped. Therefore, the sliding resistance of the balls 32*a*, 32*b* against the movable section 18 is undesirably increased, and it is difficult to smoothly displace the movable section 18.

In view of the above, in the linear electromagnetic actuator 10 according to the embodiment of the present invention, the balls 32*a*, 32*b* composed of the steel balls 33 and the balls 32*a*, 32*b* composed of the spherical members 35 made of the nonmagnetic members (for example, resin) are alternately arranged along the direction of the arrow A. Accordingly, it is possible to avoid positional deviation of the steel balls 33 which would otherwise occur due to the magnetic force as described above, and it is possible to smoothly displace the movable section 18.

As described above, the movable section 18 can be smoothly displaced by avoiding positional deviation of the steel balls 33 which would otherwise occur due to the magnetic force. Therefore, a plurality of cylindrical members composed of nonmagnetic members may be arranged in place of the spherical members 35. Alternatively, the spherical members 35 or the cylindrical members may be integrally connected by rod-shaped members composed of nonmagnetic members to forcibly prevent positional deviation of the steel balls 33 which would otherwise occur due to the magnetic force. Further alternatively, it is preferable that rods or plate members composed of nonmagnetic members are arranged in the clearances between the first to fourth projections 28*a*, 28*b*, 74*a*, 74*b*, and that the steel balls 33 are arranged in a plurality of holes formed at predetermined intervals in the direction of the arrow A in the rods or the plate members. In this arrangement, positional deviation of the steel balls 33 in the direction of the arrow A, which would otherwise occur due to the magnetic force, can be avoided by the rods or the plate members.

In the linear electromagnetic actuator 10 according to the embodiment of the present invention, it is preferable that cylindrical members composed of magnetic members are arranged in place of the steel balls 33 so that the axial direction thereof is substantially coincident with the direction of the arrow A. This is because when the cylindrical members are arranged, the cross-sectional areas of the second and third magnetic paths 80*b*, 80*c* are increased in the cylindrical members, and the magnetic resistance is lowered. As a result, the thrust force, which acts on the permanent magnets 16*a*, 16*b*, is further increased.

When the width of the coil 12 is wider than that of the permanent magnets 16a, 16b, the magnetic fluxes, which are generated by the permanent magnets 16a, 16b, can be reliably intersect with the coil 12.

When the thickness of the slide table 46 and the guide rail 20 is smaller than the width d of the permanent magnets 16a, 16b in the direction of the arrow A, it is possible to reduce the thickness and size of the entire apparatus.

For example, when the magnetic flux density, which is brought about by the permanent magnets 16a, 16b, is 0.5 to 0.6 T, and the saturation magnetic flux density of the iron-based material (pure iron, low carbon steel, stainless steel) of the guide rail 20 and the slide table 46 to serve as the yokes is 1.4 to 1.8 T, then the magnetic flux, which is about three times more than the magnetic flux generated by the permanent magnets 16a, 16b, can pass through the guide rail 20 and the slide table 46.

In the linear electromagnetic actuator 10, the magnetic fluxes, which are generated by the permanent magnets 16a, 16b, can be divided into two in the direction of the arrow A in the guide rail 20 and the slide table 46.

Therefore, in the linear electromagnetic actuator 10, the magnetic flux, which is about six times more than the magnetic flux generated by the permanent magnets 16a, 16b, can pass without causing magnetic saturation in the guide rail 20 and the slide table 46. As a result, the thickness of the guide rail 20 and the slide table 46 can be reduced to about one-sixth of the width d of the permanent magnets 16a, 16b.

In the embodiment of the present invention, the two permanent magnets 16a, 16b are arranged on the bottom surface of the slide table 46 along the direction of the arrow A. However, it is a matter of course that the thrust force for displacing the movable section 18 is further increased by arranging three or more of the permanent magnets on the slide table 46 along the direction of the arrow A.

In the linear electromagnetic actuator concerning the conventional technique, if the entire apparatus is used for a long period of time in a vertical state, then the rolling members as the guide members are moved downwardly, and hence it is impossible to provide predetermined distances necessary for the rolling members to rotate. Therefore, even when an attempt is made to move the slide table downwardly, the rolling members are moved along the guide rail and the slide plate without rotating. As a result, the sliding resistance of the guide member with respect to the movable section is increased. When the movable section is displaced in the vertical direction, it is impossible to smoothly displace the movable section.

On the contrary, in the linear electromagnetic actuator 10 according to the embodiment of the present invention, a part of the balls 32a, 32b are the steel balls 33. The magnetic force, which acts downwardly, is generated for the balls 32a, 32b arranged at the upper positions with respect to the permanent magnets 16a, 16b arranged on the slide table 46 in the vertical direction (direction of the arrow A). On the other hand, the magnetic force, which acts upwardly against gravity, is generated for the balls 32a, 32b arranged at the lower positions.

As a result, the predetermined clearances can be provided between the adjacent balls 32a, 32b. It is possible to rotate the respective balls 32a, 32b with ease. Therefore, even when the linear electromagnetic actuator 10 is used for a long period of time, the movable section 18 can be displaced smoothly.

Figure 11:
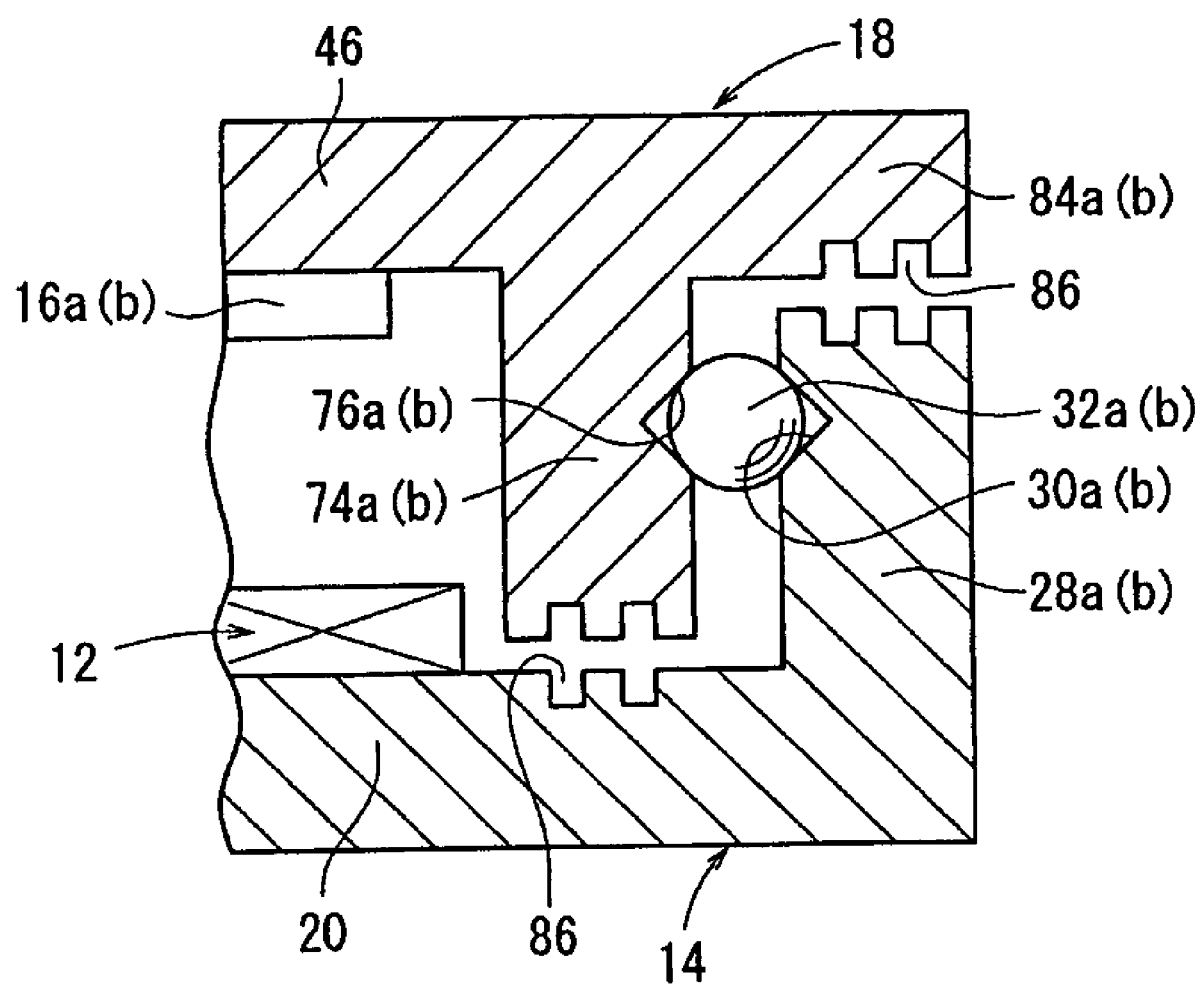
FIG. 11 is a perspective view illustrating grooves formed on projections and a guide rail of the linear electromagnetic actuator.

In the linear electromagnetic actuator 10 according to the embodiment of the present invention, as shown in FIG. 11, it is preferable to adopt the following arrangement. That is, projections 84a, 84b are formed to protrude outwardly in the direction perpendicular to the direction of the arrow A from the both sides of the slide table 46. Grooves 86 are formed on the bottom surfaces of the projections 84a, 84b, on the upper portions of the third and fourth projections 28a, 28b, on the bottom portions of the first and second projections 74a, 74b, and on the upper portions of the guide rail 20 facing the bottom portions.

That is, leakage magnetic fluxes are generated in the grooves 86, and the leakage magnetic fluxes make it possible for the grooves 86 to attract dust composed of the magnetic members collected on the balls 32a, 32b and the dust of the magnetic members generated by the rotation of the steel balls 33. As a result, the balls 32a, 32b can be prevented from adhesion of dust. The movable section 18 can be displaced smoothly under the guiding action of the balls 32a, 32b. Further, it is possible to avoid pollution of the surrounding environment by suppressing dust from escaping from the linear electromagnetic actuator 10 to the outside.

Figure 12:
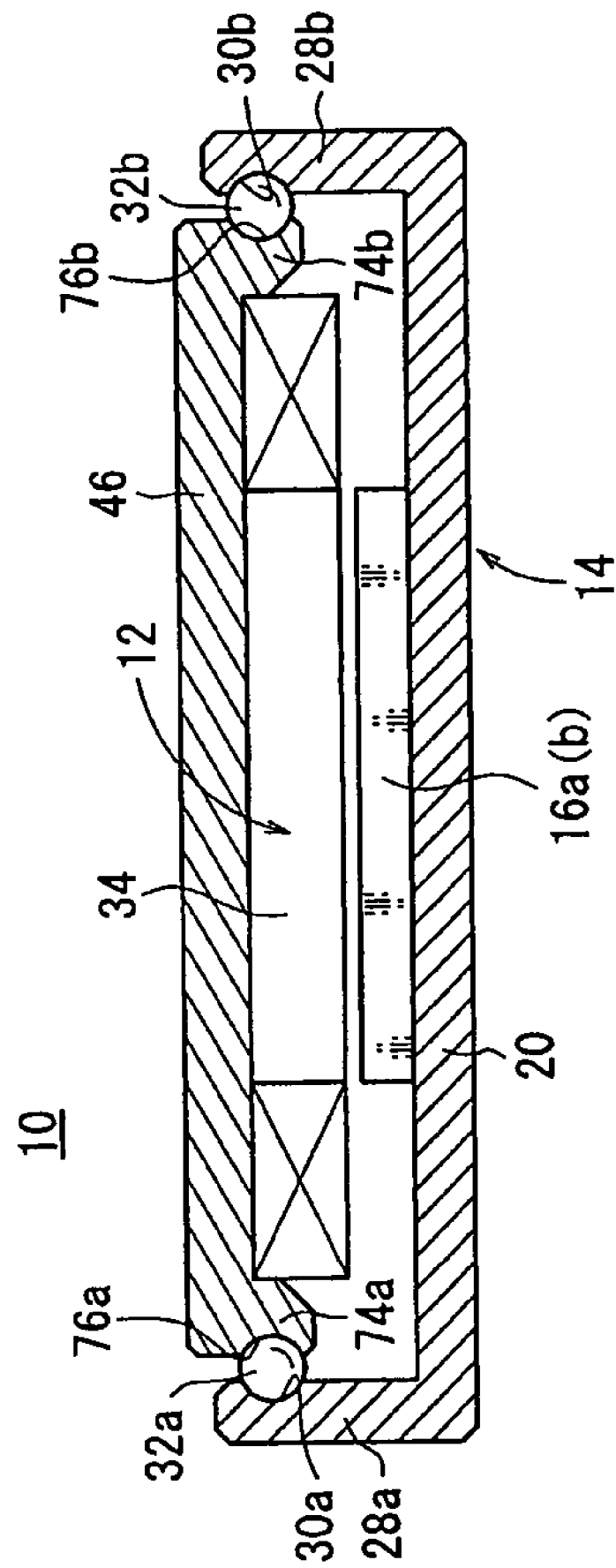
FIG. 12 is a sectional view illustrating the manner in which a coil is provided on a slide table, and permanent magnets are provided on the guide rail.

In the embodiment of the present invention, as shown in FIGS. 2 through 6, the permanent magnets 16a, 16b are arranged on the bottom surface of the slide table 46 while the coil 12 is arranged on the upper surface of the guide rail 20. Alternatively, as shown in FIG. 12, the coil 12 may be arranged on the bottom surface of the slide table 46 while the permanent magnets 16a, 16b may be arranged on the upper surface of the guide rail 20. The same advantages as mentioned above are achieved also in this arrangement.

Figure 4:
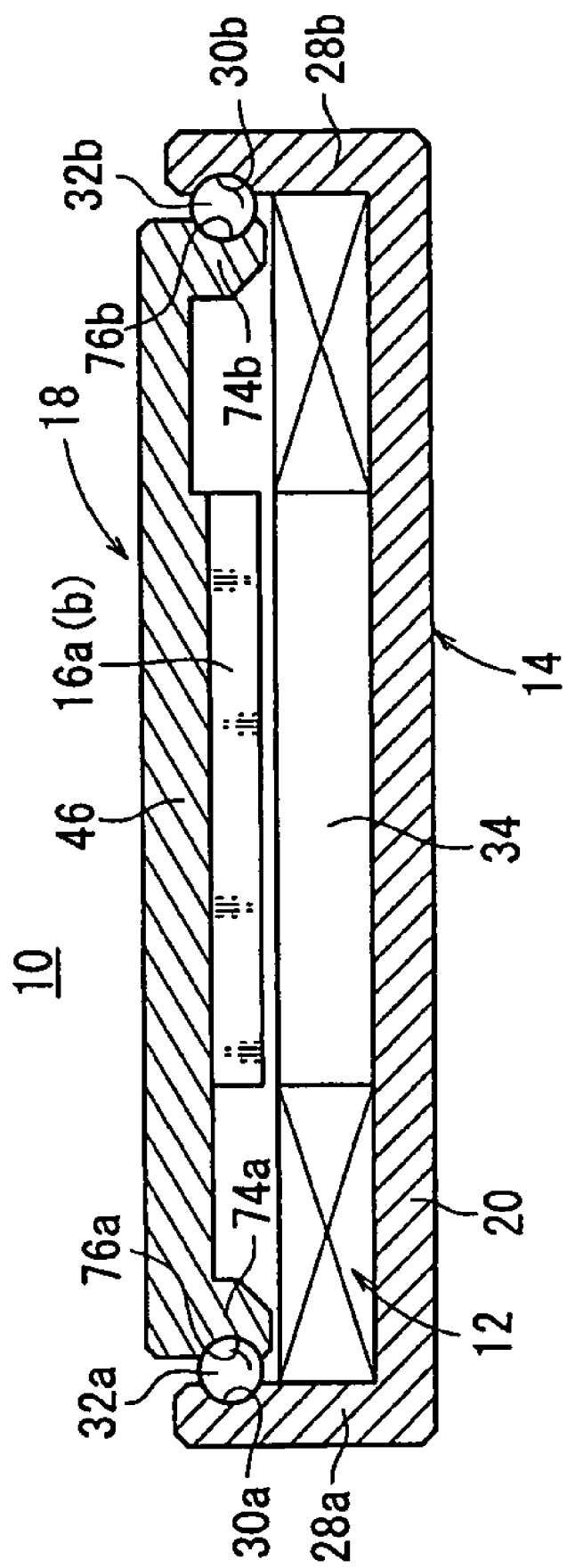
FIG. 4 is a sectional view taken along a line IV-IV shown in FIG. 1.
Figure 13A:
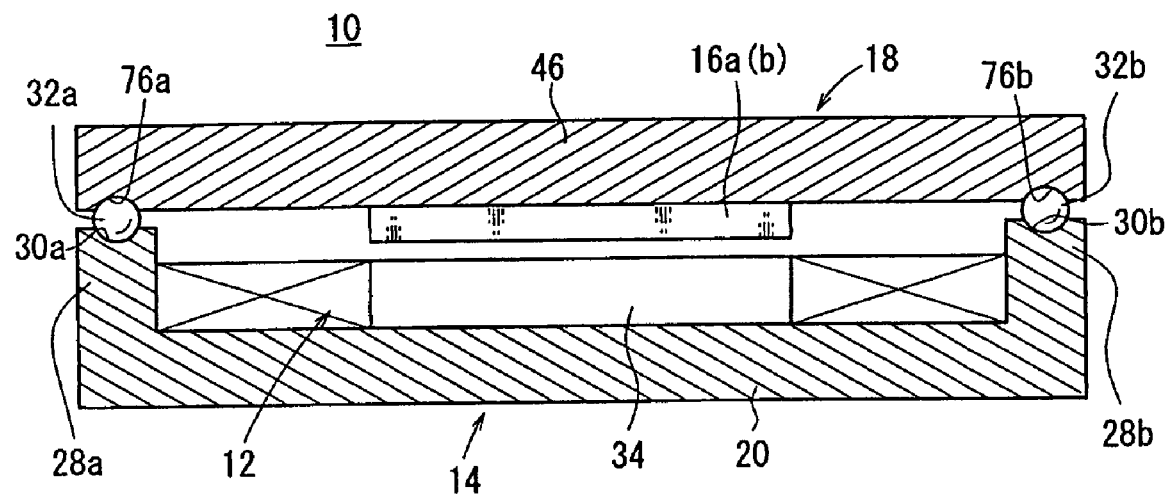
FIG. 13A is a sectional view illustrating the manner in which first and second projections are omitted.
Figure 13B:
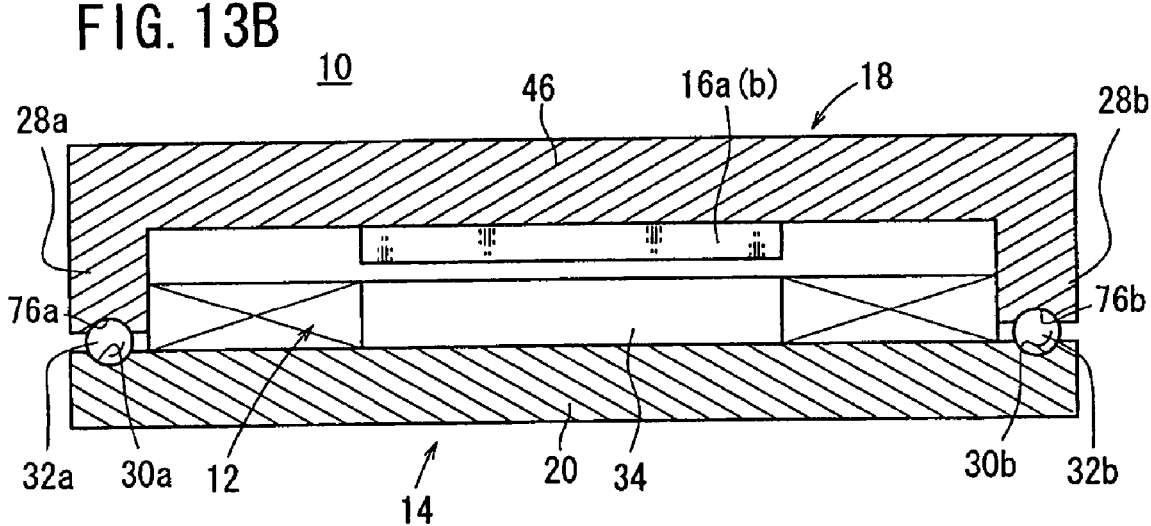
FIG. 13B is a sectional view illustrating the manner in which third and fourth projections are omitted.

In the embodiment of the present invention, as shown in FIGS. 2, 4 and 6, the first and second projections 74a, 74b are formed on both sides of the slide table 46 while the third and fourth projections 28a, 28b are formed on both sides of the guide rail 20. Alternatively, as shown in FIG. 13A, only the third and fourth projections 28a, 28b may be formed. Further, as shown in FIG. 13B, only the first and second projections 74a, 74b may be formed. The same advantages as mentioned above are achieved also in these structures. In FIG. 13A, the balls 32a and 32b are interposed between the third and fourth projections 28a, 28b and the bottom surface of the slide table 46, respectively. In FIG. 13B, the balls 32a and 32b are interposed between the first and second projections 74a, 74b and the upper surface of the guide rail 20, respectively.

Figure 14A:
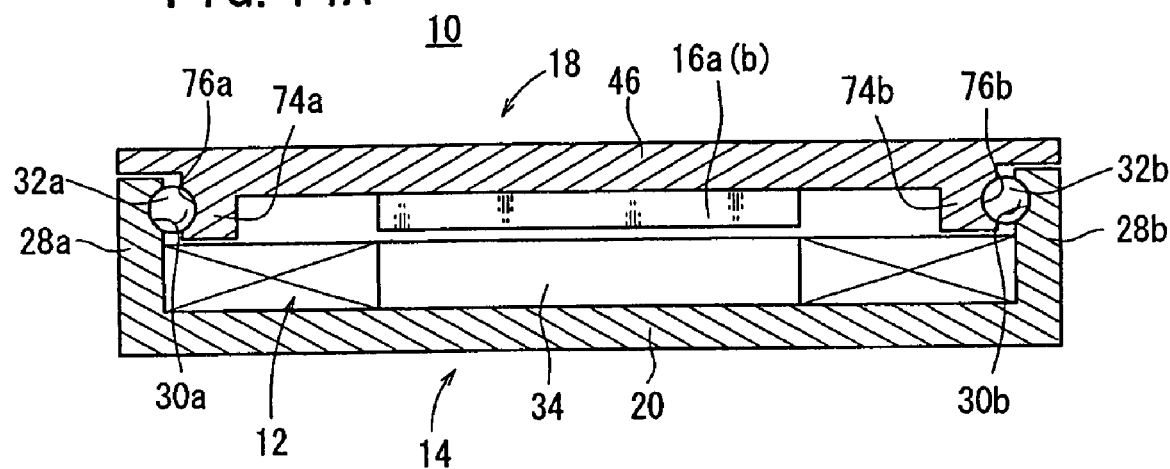
FIG. 14A is a sectional view illustrating the manner in which the third and fourth projections are provided outside of the first and second projections.
Figure 14B:
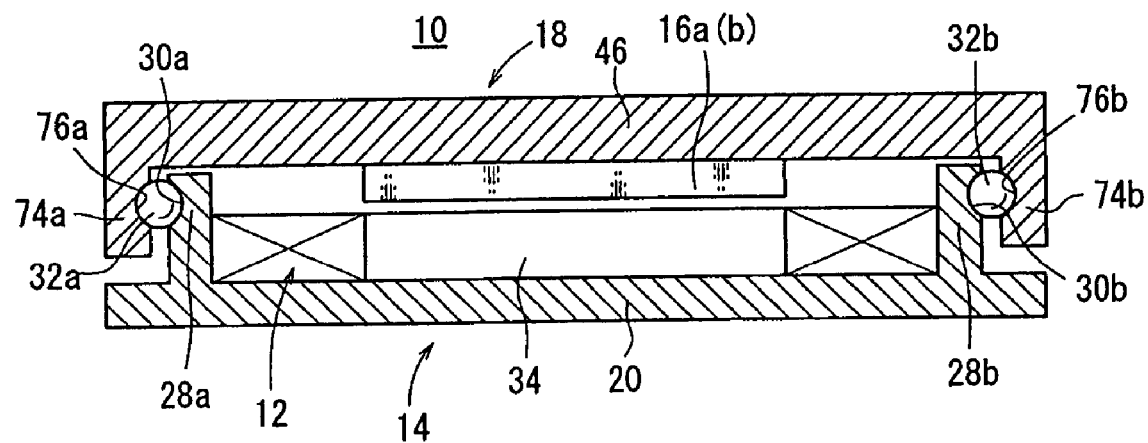
FIG. 14B is a sectional view illustrating the manner in which the third and fourth projections are provided inside of the first and second projections.

Alternatively, as shown in FIG. 14A, the first and second projections 74a, 74b may be formed inside of the third and fourth projections 28a, 28b. Further alternatively, as shown in FIG. 14B, the third and fourth projections 28a, 28b may be formed inside of the first and second projections 74a, 74b. The same advantages as mentioned above are achieved also in these structures.

Figure 15A:
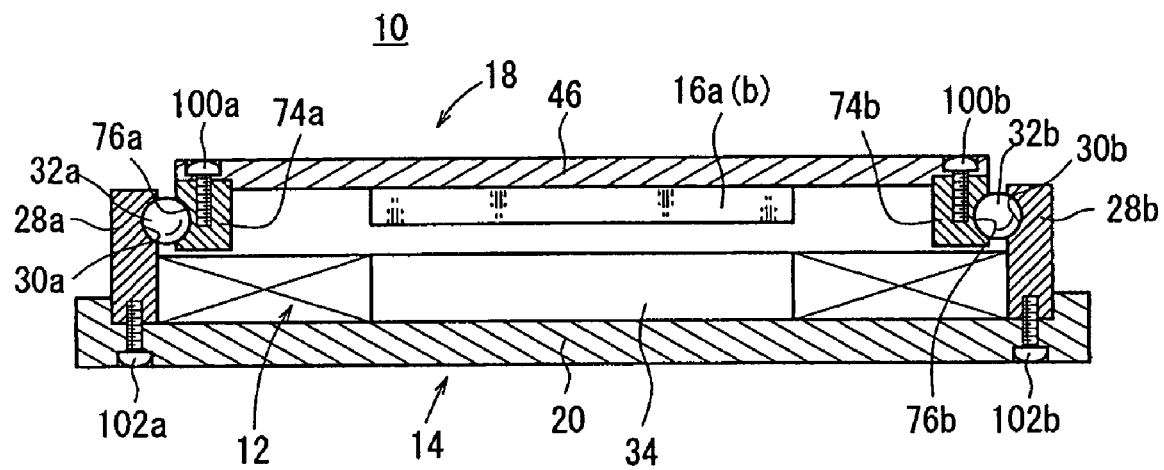
FIGS. 15A and 15B are sectional views illustrating the manner in which the slide table and the first and second projections are provided separately, and the guide rail and the third and fourth projections are provided separately.
Figure 15B:
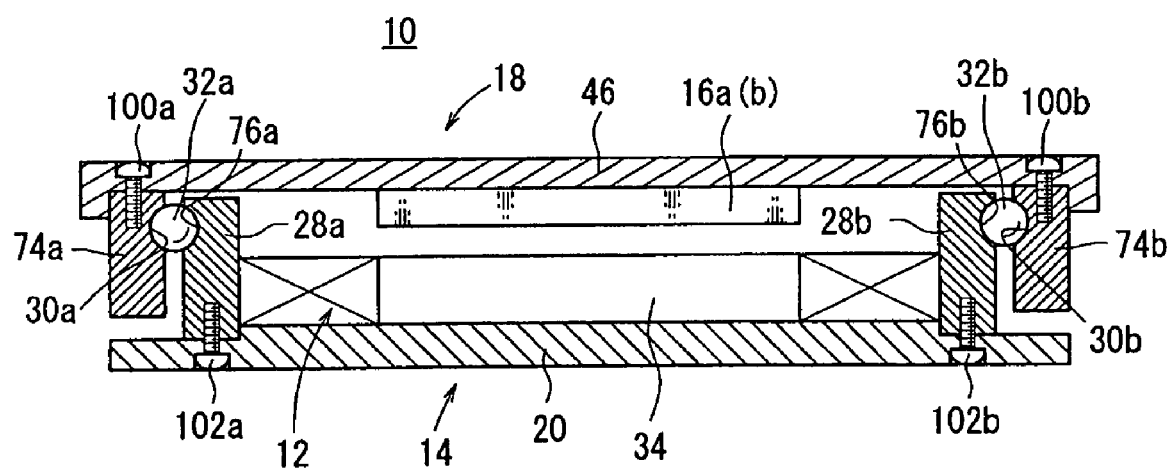

In the embodiment of the present invention, as shown in FIGS. 2, 4 and 6, the first and second projections 74a, 74b are formed integrally with the slide table 46 while the third and fourth projections 28a, 28b are formed integrally with the guide rail 20. Alternatively, as shown in FIGS. 15A, 15B, the first and second projections 74a, 74b may be fixed to both sides of the slide table 46 with screws 100a, 100b, respectively, and the third and fourth projections 28a, 28b may be fixed to both sides of the guide rail 20 with screws 102a, 102b, respectively. The same advantages as mentioned above are achieved also in these structures. In FIG. 15A, the first and second projections 74a, 74b are arranged inside of the third and fourth projections 28a, 28b. In FIG. 15B, the third and fourth projections 28a, 28b are arranged inside of the first and second projections 74a, 74b.

Figure 16:
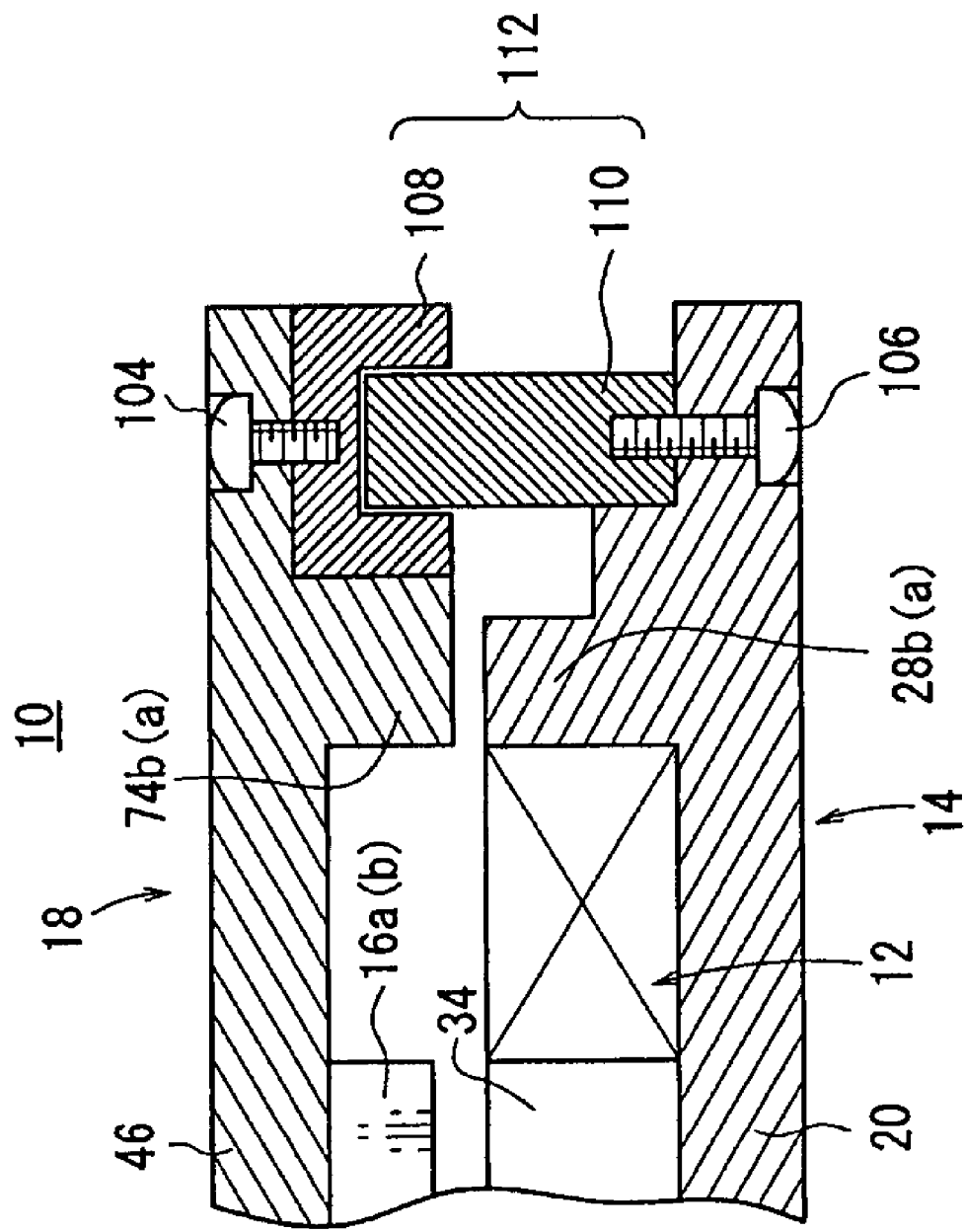
FIG. 16 is a sectional view illustrating a linear guide provided outside of the first through fourth projections.
Figure 17:
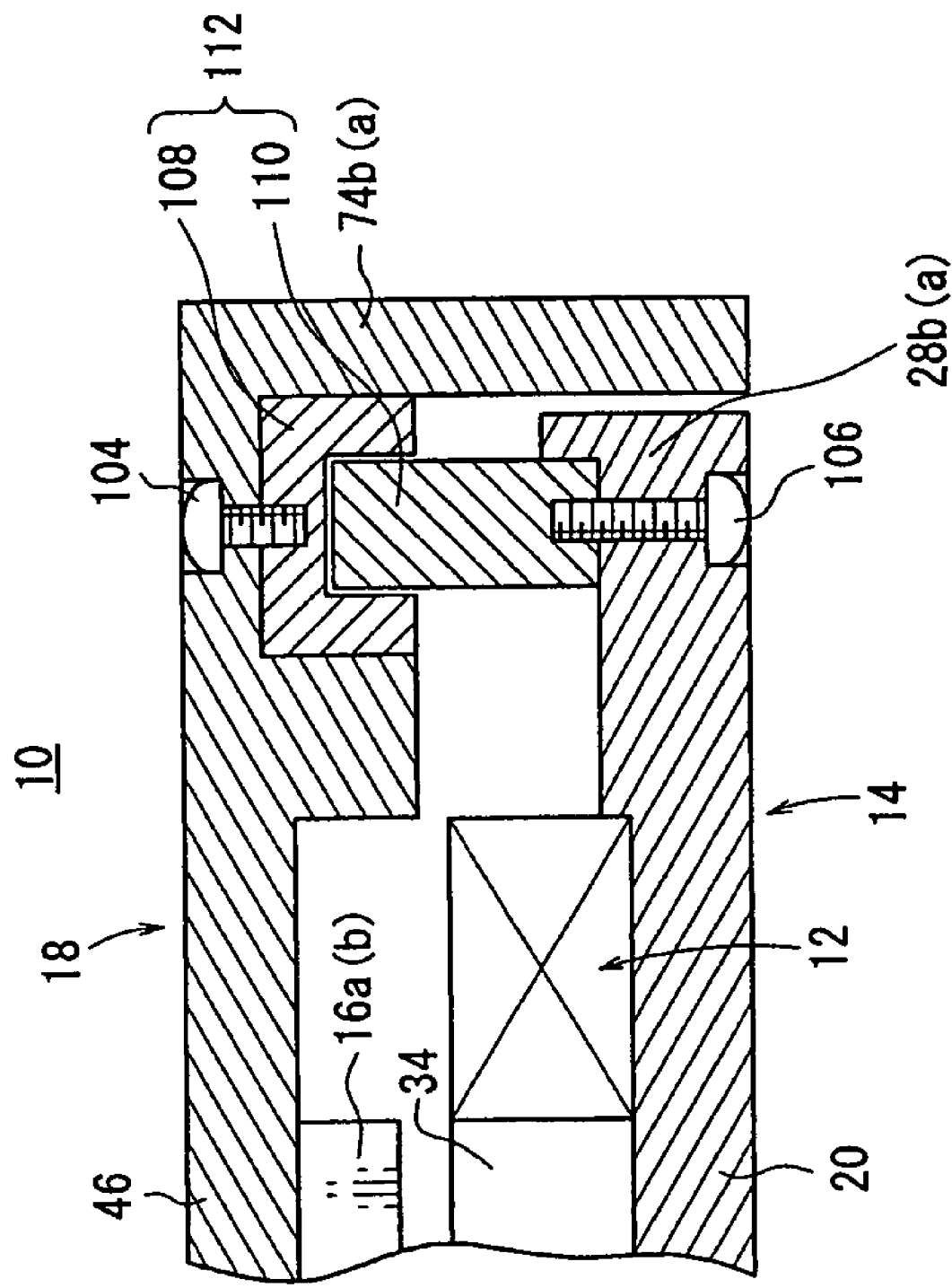
FIG. 17 is a sectional view illustrating the linear guide provided inside of the first through fourth projections.
Figure 18:
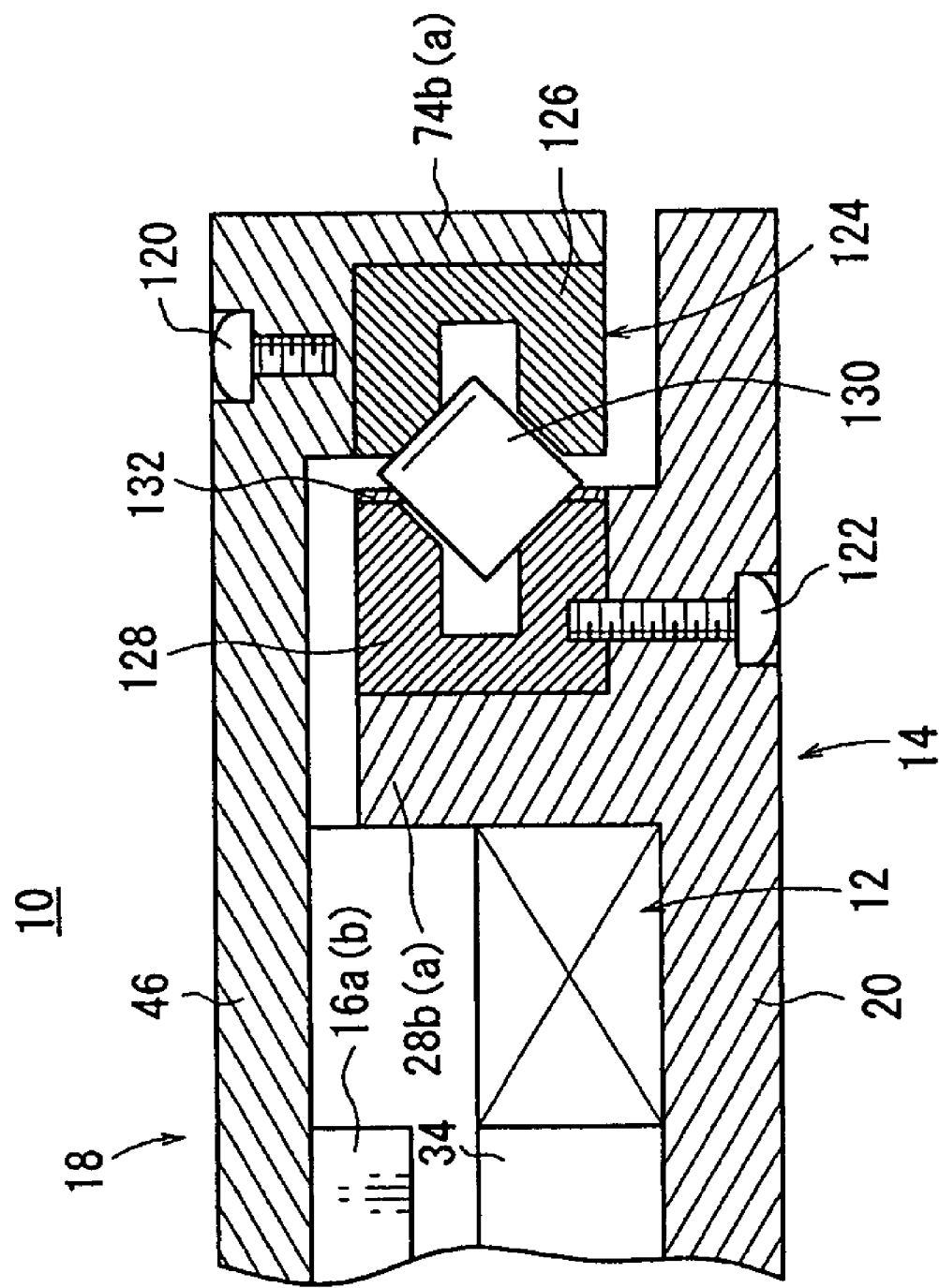
FIG. 18 is a sectional view illustrating the liner guide interposed between the first and second projections and the third and fourth projections.

In the embodiment of the present invention, as shown in FIGS. 2, 4 and 6, the balls 32a and 32b, which serve as rolling members, are interposed between the slide table 46 and the guide rail 20, respectively. Alternatively, as shown in FIGS. 16 through 18, a linear guide 112 or 124 may be arranged instead of the balls 32*a*, 32*b*. In this structure, the movable section 18 may be displaced with respect to the fixed section 14 while guided by the linear guide 112 or 124.

In FIG. 16, the linear guide 112 is arranged outside of the first through fourth projections 28*a*, 28*b*, 74*a*, 74*b*. A guide rail 110 of the linear guide 112 is fixed to the upper surface of the guide rail 20 with a screw 106. A slide table 108 is fixed to the bottom surface of the slide table 46 with a screw 104. In FIG. 17, the linear guide 112 is arranged inside of the first and second projections 74*a*, 74*b*, and arranged at the upper portions of the third and fourth projections 28*a*, 28*b*.

In FIG. 18, the linear guide 124 has a support member 126, a support member 128, a roller (or rollers) 130, and a limit member 132. The support member 126 has a substantially U-shaped cross section, and is fixed to the slide table 46 with a screw 120 at a portion inside of the first and second projections 74*a*, 74*b*. The support member 128 has a substantially U-shaped cross section, and is fixed to the guide rail 20 with a screw 122 at a portion outside of the third and fourth projections 28*a*, 28*b*. The roller 130 is a substantially cylindrical magnetic member, and supported between the support members 126 and 128. The limit member 132 limits the vertical movement or the movement in the direction of the arrow A (see FIGS. 1 through 3) of the roller 130. The limit member 132 also functions as a holding member for holding the roller 130. In this structure, the contact portions between the support member 126 and the roller 130, where the support member 126 faces the support member 128, are tapered to the third and fourth projections 28*a*, 28*b*. Also, the contact portions between the support member 128 and the roller 130, where the support member 128 faces the support member 126, are tapered to the first and second projections 74*a*, 74*b*. Thus, the slide table 46 connected to the support member 126 is displaceable with respect to the guide rail 20 under the guiding action of the roller 130.

As shown in FIGS. 16 through 18, the linear guides 112, 124 are arranged in the vicinity of the first through fourth projections 28*a*, 28*b*, 74*a*, 74*b*. Then, leakage magnetic fluxes are generated in the gap between the first and second projections 74*a*, 74*b* and the third and fourth projections 28*a*, 28*b*. The leakage magnetic fluxes make it possible for the gap to attract dust composed of the magnetic members collected on the linear guides 112, 124 and dust composed of magnetic members generated by the linear guides 112, 124 when the linear guides 112, 124 are magnetic members. As a result, the linear guides 112, 124 can be prevented from adhesion of dust. The slide table 46 can be displaced smoothly under the guiding action of the linear guides 112, 124.

Figure 19:
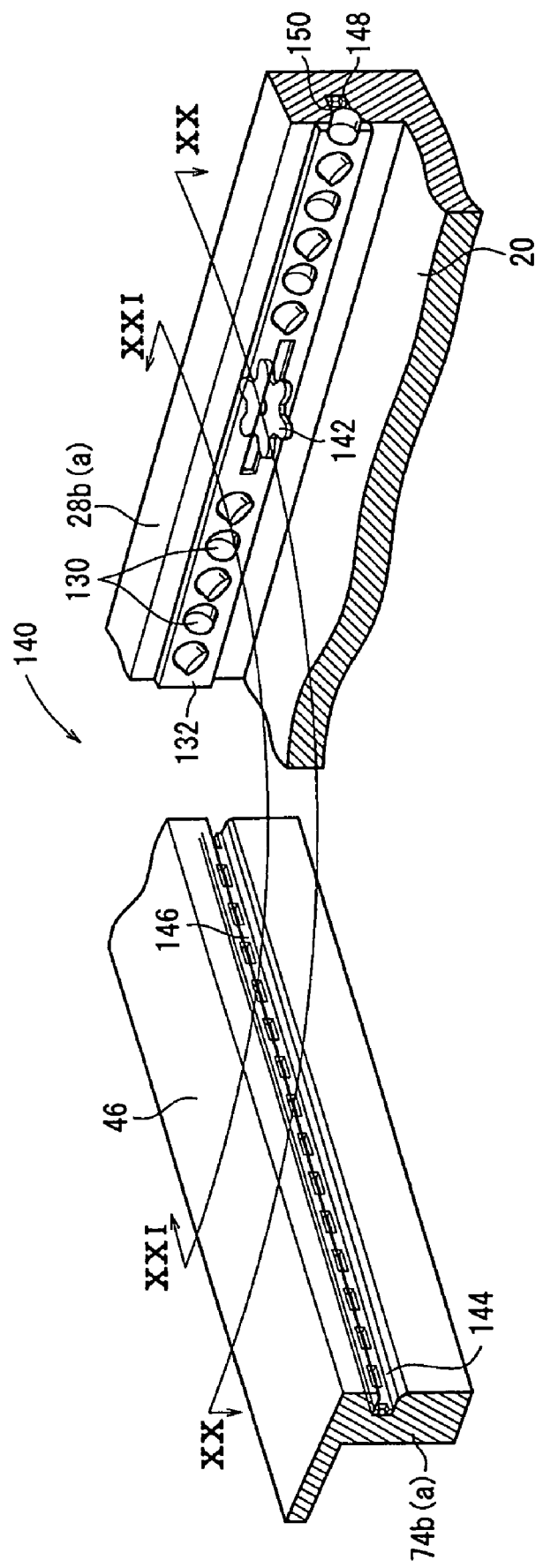
FIG. 19 is a sectional view illustrating the liner guide interposed between the first and second projections and the third and fourth projections.
Figure 20:
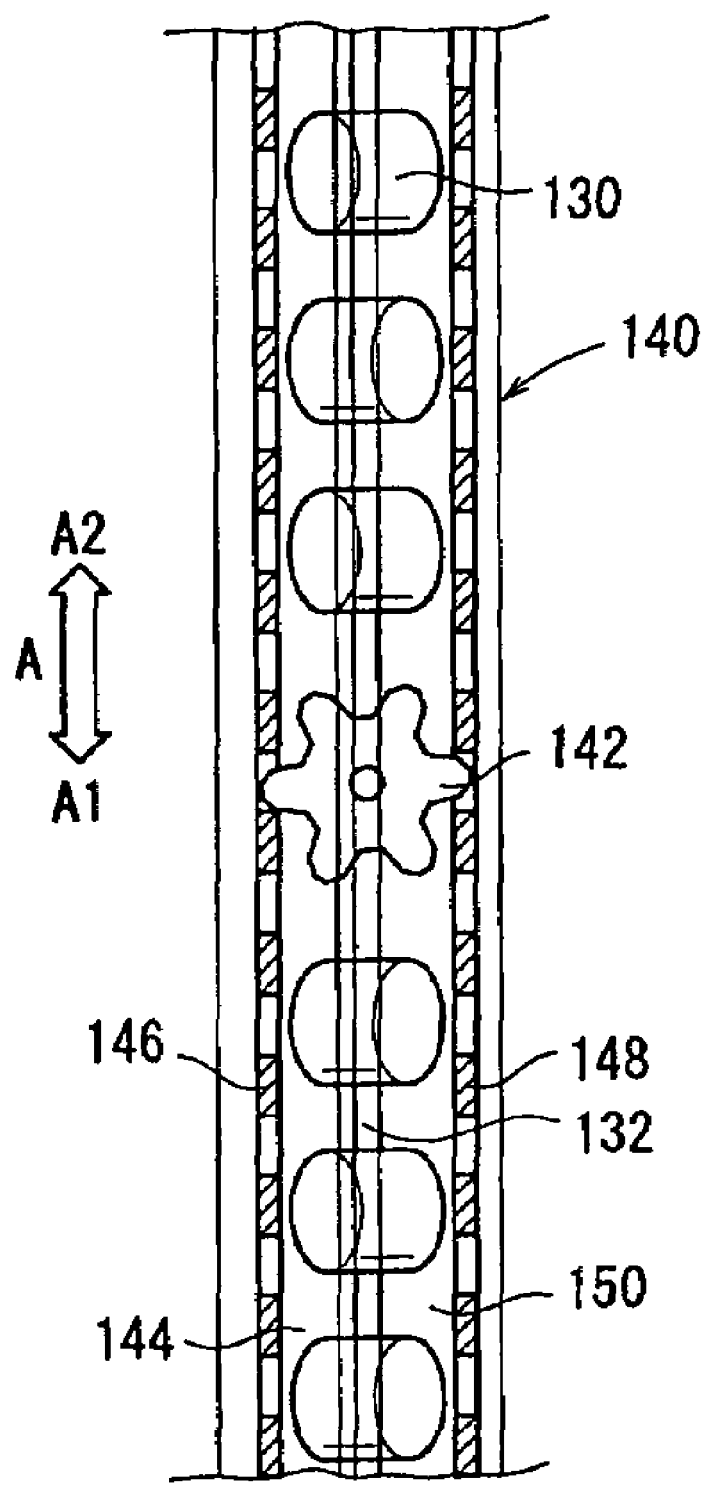
FIG. 20 is a sectional view taken along a line XX-XX shown in FIG. 19.
Figure 21:
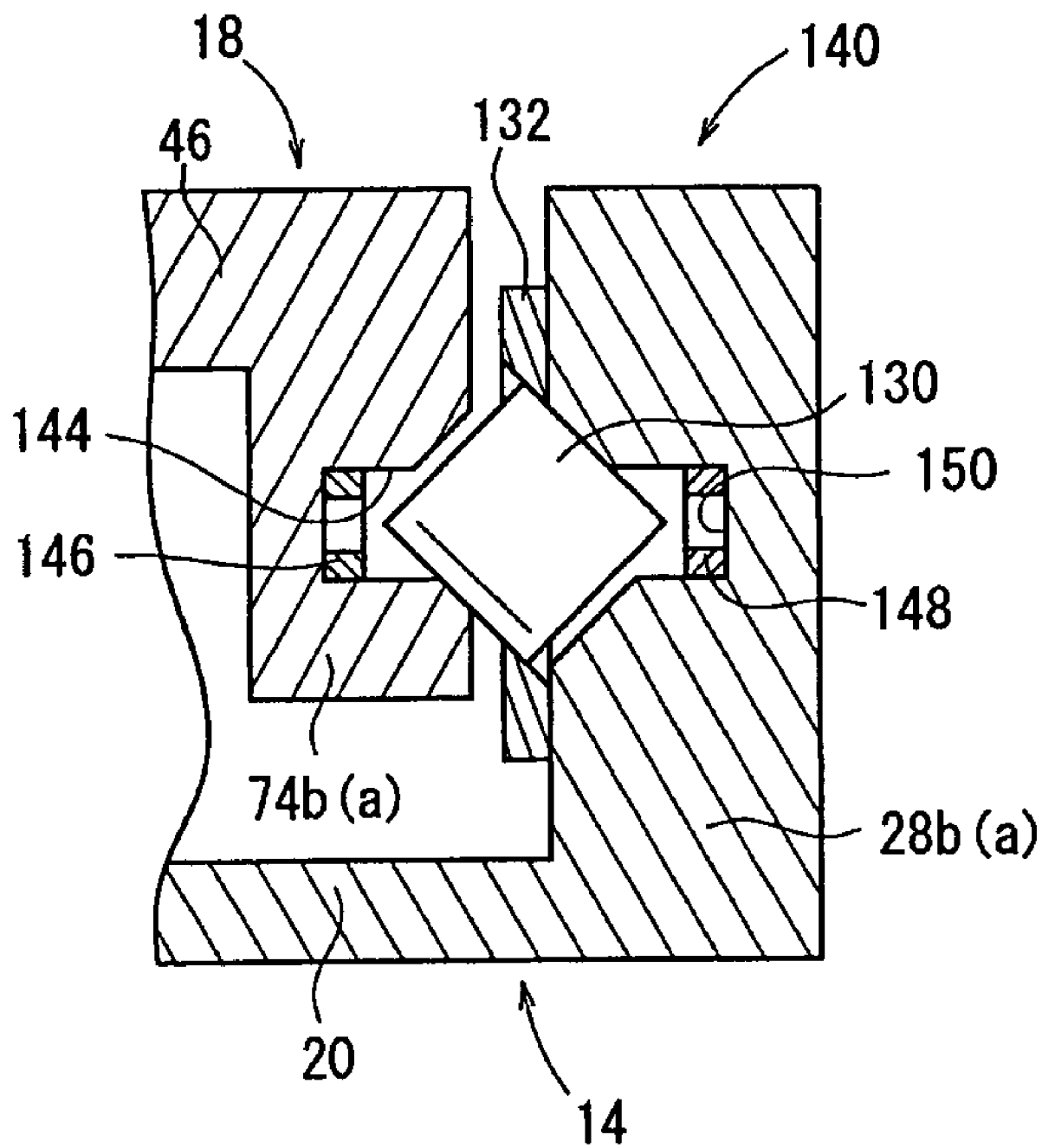
FIG. 21 is a sectional view taken along a line XXI-XXI shown in FIG. 19.

Alternatively, as shown in FIGS. 19 through 21, a recess 144 may be formed in the side of each of the first and second projections 74*a*, 74*b*, while a recess 150 may be formed in the side of each of the third and fourth projections 28*a*, 28*b*. Then, a guide member 140 having the roller 130 and the limit member 132, or having a pinion 142 may be interposed between the recesses 144 and 150.

In this structure, racks 146, 148 made up of a plurality of cylindrical members are arranged in the recesses 144, 150 in the direction of the arrow A (see FIG. 20), so that the pinion 142 is engageable with the racks 146, 148. Parts of the recesses 144, 150 which contact the rollers 130 are tapered. As a result, the slide table 46 can be displaced smoothly on the guide rail 20 under the guiding action of the rollers 130 and the engaging action between the pinion 142 and the racks 146, 148. Since the pinion 142 engages with the racks 146, 148, the positional deviation of the limit member 132 can be avoided. As shown in FIGS. 19 and 21, the rollers 130 are slanted alternately in the direction of the arrow A.

In FIGS. 18 through 21, the slide table 46 is displaced with respect to the guide rail 20 under the guiding action of the rollers 130. Alternatively, the slide table 46 can be displaced when the balls 32*a*, 32*b* as steel balls may be arranged instead of the rollers 130.

It is a matter of course that the linear electromagnetic actuator according to the present invention is not limited to the embodiment described above, which may be embodied in other various forms without deviating from the gist or essential characteristics of the present invention.

What is claimed is:

1. A linear electromagnetic actuator for displacing a movable section including permanent magnets by a thrust force generated by allowing a current to flow through a coil of a fixed section, wherein said movable section has a first yoke for supporting said permanent magnets, said fixed section has a second yoke for supporting said coil facing said permanent magnets while being separated therefrom, a first projection and a second projection are formed on both sides of said first yoke protruding toward said second yoke and extending in a direction of displacement of said movable section, said first projection and said second projection are slightly separated from said second yoke, a first guide member is interposed between said first projection and said second yoke, and a second guide member is interposed between said second projection and said second yoke, wherein each of said first guide member and said second guide member is composed of a plurality of rolling members, and a part of said rolling members are first rolling members composed of magnetic members.

2. The linear electromagnetic actuator according to claim 1, wherein a third projection and a fourth projection are formed on both sides of said second yoke protruding toward said first yoke and extending along directions parallel to said first projection and said second projection, said first guide member is interposed between said first projection and said third projection, and said second guide member is interposed between said second projection and said fourth projection.

3. The linear electromagnetic actuator according to claim 2, wherein said second yoke has a width which is wider than that of said first yoke, guide grooves are formed at outer portions of said first projection and said second projection in said direction of displacement of said movable section, guide grooves are formed at inner portions of said third projection and said fourth projection in said direction of displacement of said movable section, said first yoke and said second yoke are arranged so that said guide grooves have substantially the same height, and said first guide member and said second guide member are accommodated in clearances formed by said guide grooves.

4. The linear electromagnetic actuator according to claim 1, wherein said first rolling members are steel balls or cylindrical members whose axial direction is the same as said direction of displacement of said movable section.

5. The linear electromagnetic actuator according to claim 1, wherein each of said first guide member and said second guide member comprises said first rolling members and second rolling members composed of nonmagnetic members, and said first and second rolling members are arranged alternately along said direction of displacement of said movable section.

6. The linear electromagnetic actuator according to claim 5, wherein said second rolling members are spherical members, cylindrical members, or a plurality of spherical members or cylindrical members which are integrally connected to each other by rod-shaped members composed of nonmagnetic members.

7. The linear electromagnetic actuator according to claim 1, wherein each of said first guide member and said second guide member is constructed by a plurality of first rolling members composed of magnetic members which are arranged in a plurality of holes formed at predetermined intervals in plate members or rods composed of nonmagnetic members.

8. The linear electromagnetic actuator according to claim 1, wherein said coil has a width which is wider than that of said permanent magnets.

9. The linear electromagnetic actuator according to claim 1, wherein said first yoke and said second yoke have wall thicknesses which are smaller than widths of said permanent magnets in said direction of displacement.

10. The linear electromagnetic actuator according to claim 1, wherein grooves, which accumulate dust composed of magnetic members, are formed in the vicinity of said first guide member and said second guide member of said first yoke and said second yoke.

11. The linear electromagnetic actuator according to claim 10, wherein projections, which protrude in directions perpendicular to said direction of displacement of said movable section, are formed on both sides of said first yoke, and said grooves are formed at portions of said projections facing said second yoke, portions of said first projection and said second projection facing said second yoke, and portions of said second yoke facing said projections and said first and second projections respectively.

12. The linear electromagnetic actuator according to claim 1, wherein a fastening member, which prevents said first guide member and said second guide member from falling out, is arranged on one end of said second yoke, and a fastening member, which prevents said first guide member and said second guide member from falling out, is arranged on the other end of said second yoke.

13. The linear electromagnetic actuator according to claim 12, wherein a stopper is arranged on said other end of said second yoke, and an end block and a stopper, which limit displacement of said movable section in cooperation with said stopper, are arranged on said first yoke.

14. The linear electromagnetic actuator according to claim 12, wherein a plate-shaped member, which is capable of making abutment against said first guide member and said second guide member disposed at said one end of said second yoke when said movable section is displaced toward said other end of said second yoke, is arranged on said first yoke.

15. The linear electromagnetic actuator according to claim 1, wherein said permanent magnets are arranged along said direction of displacement of said movable section.

16. The linear electromagnetic actuator according to claim 1, wherein screw holes, which fix said fixed section or said movable section to another member, are formed in said fixed section or said movable section.

17. The linear electromagnetic actuator according to claim 1, wherein a scale is arranged on a surface of said first yoke on a side of said second yoke, an encoder is arranged on said second yoke facing said scale, and said encoder receives reflected light with respect to light emitted toward said scale when said movable section is displaced so that a displacement amount of said movable section is calculated based on an amount of said reflected light.

18. A linear electromagnetic actuator for displacing a movable section respective to a fixed section by a thrust force generated by allowing a current to flow through a coil, wherein said movable section has a first yoke, said fixed section has a second yoke, guide members are interposed between said fixed section and said movable section, projections are provided on at least one of said first yoke and said second yoke, said projections extending along a direction of displacement of said movable section, if said projections are provided on said first yoke, said projections face said second yoke, while if said projections are provided on said second yoke, said projections face said first yoke, and if said coil is arranged on said first yoke, permanent magnets are arranged on said second yoke, while if said coil is arranged on said second yoke, said permanent magnets are arranged on said first yoke, wherein said guide members are composed of a plurality of rolling members, and a part of said rolling members are first rolling members composed of magnetic members.

19. A linear electromagnetic actuator according to claim 18, wherein said projections are integrally formed on said first yoke or said second yoke, or alternatively, said projections are magnetic members provided on said first yoke or said second yoke.

20. A linear electromagnetic actuator according to claim 18, wherein said guide members are spherical or cylindrical rolling members.

21. A linear electromagnetic actuator according to claim 20, wherein a holding member is provided along said direction of displacement of said movable section between said movable section and said fixed section, said holding member holding said rolling members.

22. A linear electromagnetic actuator according to claim 21, wherein a rack is provided along said direction of displacement of said movable section on at least one of said movable section and said fixed section, and a pinion is supported by said holding member for engaging with said rack.

* * * * *